United States Patent
Chen et al.

(10) Patent No.: US 12,543,169 B2
(45) Date of Patent: Feb. 3, 2026

(54) TECHNIQUES FOR SINGLE FREQUENCY NETWORK AND TIME DIVISION MULTIPLEXING PHYSICAL UPLINK CONTROL CHANNEL

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 460 days.

(21) Appl. No.: 17/813,186

(22) Filed: Jul. 18, 2022

(65) Prior Publication Data

US 2024/0023089 A1    Jan. 18, 2024

(51) Int. Cl.
*H04W 72/12*    (2023.01)
*H04L 1/08*    (2006.01)
(Continued)

(52) U.S. Cl.
CPC ........... *H04W 72/1268* (2013.01); *H04L 1/08* (2013.01); *H04W 72/566* (2023.01)

(58) Field of Classification Search
CPC ..... H04W 72/12; H04W 72/56; H04W 72/00; H04W 72/20; H04W 72/04; H04W 72/21;
(Continued)

(56) References Cited

U.S. PATENT DOCUMENTS 10,651,917 B2    5/2020    John Wilson et al.
11,546,933 B2 *    1/2023    Fakoorian ............... H04L 5/001
(Continued)

FOREIGN PATENT DOCUMENTS

WO    WO-2022147815 A1    7/2022

OTHER PUBLICATIONS

International Search Report and Written Opinion—PCT/US2023/068706—ISA/EPO—Oct. 11, 2023.
(Continued)

*Primary Examiner* — Man U Phan
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive, from a network node, configuration information that indicates one or more physical uplink control channel (PUCCH) resources that support a single frequency network (SFN) mode. The UE may receive, from the network node, beam information that indicates a plurality of transmission configuration indication (TCI) states to apply to transmit a PUCCH using a PUCCH resource associated with a PUCCH format. The UE may determine a transmission mode in which to transmit the PUCCH based at least in part on the beam information, wherein the transmission mode includes one or more of the SFN mode, a time division multiplexing (TDM) mode, or a single TCI state mode. The UE may transmit, to the network node, the PUCCH using the transmission mode. Numerous other aspects are described.

30 Claims, 12 Drawing Sheets

(51) Int. Cl.
*H04W 72/1268* (2023.01)
*H04W 72/566* (2023.01)

(58) Field of Classification Search
CPC ..... H04W 72/23; H04W 72/53; H04W 72/54; H04W 72/51; H04W 74/00; H04W 74/08; H04W 76/20; H04W 84/06; H04L 1/08; H04L 1/00; H04L 5/00; H04L 1/16; H04L 27/26; H04B 7/06; H04B 7/01; H04B 7/02; H04B 7/08; H04B 7/18
USPC .......................................................... 370/329
See application file for complete search history.

(56) References Cited

U.S. PATENT DOCUMENTS

| | | | | |
|---|---|---|---|---|
| 11,705,999 | B2* | 7/2023 | Venugopal | H04W 72/046 375/262 |
| 11,824,815 | B2* | 11/2023 | Yi | H04B 7/06968 |
| 11,832,283 | B2* | 11/2023 | Khoshnevisan | H04L 1/1819 |
| 12,107,683 | B2* | 10/2024 | Cirik | H04L 1/08 |
| 2020/0100154 | A1* | 3/2020 | Cirik | H04B 7/06964 |
| 2022/0200736 | A1 | 6/2022 | Cirik et al. | |
| 2024/0040584 | A1* | 2/2024 | Yuan | H04W 72/232 |
| 2024/0057111 | A1* | 2/2024 | Lin | H04W 72/1263 |
| 2024/0057113 | A1* | 2/2024 | Zhu | H04L 5/0055 |
| 2024/0098521 | A1* | 3/2024 | Gao | H04W 16/28 |
| 2024/0172245 | A1* | 5/2024 | Svedman | H04W 72/21 |
| 2024/0195483 | A1* | 6/2024 | Jang | H04W 52/242 |
| 2024/0237118 | A9* | 7/2024 | Jung | H04B 7/06 |

OTHER PUBLICATIONS

VIVO: "Views on Unified TCI Framework Extension for Multi-TRP", 3GPP TSG RAN WG1 #109-e, R1-2203541, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 20 Pages, XP052153016, section 2, section 2.1, section 2.2.2.

* cited by examiner

TECHNIQUES FOR SINGLE FREQUENCY NETWORK AND TIME DIVISION MULTIPLEXING PHYSICAL UPLINK CONTROL CHANNEL

FIELD OF THE DISCLOSURE

Aspects of the present disclosure generally relate to wireless communication and to techniques and apparatuses for single frequency network (SFN) and time division multiplexing (TDM) physical uplink control channel (PUCCH).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

These multiple access technologies have been adopted in various telecommunication standards to provide a common protocol that enables different UEs to communicate on a municipal, national, regional, or global level. New Radio (NR), which also may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency-division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation.

SUMMARY

Some aspects described herein relate to a user equipment (UE) for wireless communication. The UE may include a memory and one or more processors coupled to the memory. The one or more processors may be configured to receive, from a network node, configuration information that indicates one or more physical uplink control channel (PUCCH) resources that support a single frequency network (SFN) mode. The one or more processors may be configured to receive, from the network node, beam information that indicates a plurality of transmission configuration indication (TCI) states to apply to transmit a PUCCH using a PUCCH resource associated with a PUCCH format. The one or more processors may be configured to determine a transmission mode in which to transmit the PUCCH based at least in part on the beam information, wherein the transmission mode includes one or more of the SFN mode, a time division multiplexing (TDM) mode, or a single TCI state mode. The one or more processors may be configured to transmit, to the network node, the PUCCH using the transmission mode.

Some aspects described herein relate to a network node for wireless communication. The network node may include a memory and one or more processors coupled to the memory. The one or more processors may be configured to transmit, to a UE, configuration information that indicates one or more PUCCH resources that support an SFN mode. The one or more processors may be configured to transmit, to the UE, beam information that indicates a plurality of TCI states to apply to transmit a PUCCH using a PUCCH resource associated with a PUCCH format. The one or more processors may be configured to receive, from the UE, the PUCCH in a transmission mode that is based at least in part on the beam information, wherein the transmission mode includes one or more of the SFN mode, a TDM mode, or a single TCI state mode.

Some aspects described herein relate to a method of wireless communication performed by a UE. The method may include receiving, from a network node, configuration information that indicates one or more PUCCH resources that support an SFN mode. The method may include receiving, from the network node, beam information that indicates a plurality of TCI states to apply to transmit a PUCCH using a PUCCH resource associated with a PUCCH format. The method may include determining a transmission mode in which to transmit the PUCCH based at least in part on the beam information, wherein the transmission mode includes one or more of the SFN mode, a TDM mode, or a single TCI state mode. The method may include transmitting, to the network node, the PUCCH using the transmission mode.

Some aspects described herein relate to a method of wireless communication performed by a network node. The method may include transmitting, to a UE, configuration information that indicates one or more PUCCH resources that support an SFN mode. The method may include transmitting, to the UE, beam information that indicates a plurality of TCI states to apply to transmit a PUCCH using a PUCCH resource associated with a PUCCH format. The method may include receiving, from the UE, the PUCCH in a transmission mode that is based at least in part on the beam information, wherein the transmission mode includes one or more of the SFN mode, a TDM mode, or a single TCI state mode.

Some aspects described herein relate to a non-transitory computer-readable medium that stores a set of instructions for wireless communication by a UE. The set of instructions, when executed by one or more processors of the UE, may cause the UE to receive, from a network node, configuration information that indicates one or more PUCCH resources that support an SFN mode. The set of instructions, when executed by one or more processors of the UE, may cause the UE to receive, from the network node, beam information that indicates a plurality of TCI states to apply to transmit a PUCCH using a PUCCH resource associated with a PUCCH format. The set of instructions, when executed by one or more processors of the UE, may cause the UE to determine a transmission mode in which to transmit the PUCCH based at least in part on the beam information, wherein the transmission mode includes one or more of the SFN mode, a TDM mode, or a single TCI state mode. The set of instructions, when executed by one or more processors of the UE, may cause the UE to transmit, to the network node, the PUCCH using the transmission mode.

Some aspects described herein relate to a non-transitory computer-readable medium that stores a set of instructions for wireless communication by a network node. The set of instructions, when executed by one or more processors of the network node, may cause the network node to transmit, to a UE, configuration information that indicates one or more PUCCH resources that support an SFN mode. The set of instructions, when executed by one or more processors of the network node, may cause the network node to transmit, to the UE, beam information that indicates a plurality of TCI states to apply to transmit a PUCCH using a PUCCH resource associated with a PUCCH format. The set of instructions, when executed by one or more processors of the network node, may cause the network node to receive, from the UE, the PUCCH in a transmission mode that is based at least in part on the beam information, wherein the transmission mode includes one or more of the SFN mode, a TDM mode, or a single TCI state mode.

Some aspects described herein relate to an apparatus for wireless communication. The apparatus may include means for receiving, from a network node, configuration information that indicates one or more PUCCH resources that support an SFN mode. The apparatus may include means for receiving, from the network node, beam information that indicates a plurality of TCI states to apply to transmit a PUCCH using a PUCCH resource associated with a PUCCH format. The apparatus may include means for determining a transmission mode in which to transmit the PUCCH based at least in part on the beam information, wherein the transmission mode includes one or more of the SFN mode, a TDM mode, or a single TCI state mode. The apparatus may include means for transmitting, to the network node, the PUCCH using the transmission mode.

Some aspects described herein relate to an apparatus for wireless communication. The apparatus may include means for transmitting, to a UE, configuration information that indicates one or more PUCCH resources that support an SFN mode. The apparatus may include means for transmitting, to the UE, beam information that indicates a plurality of TCI states to apply to transmit a PUCCH using a PUCCH resource associated with a PUCCH format. The apparatus may include means for receiving, from the UE, the PUCCH in a transmission mode that is based at least in part on the beam information, wherein the transmission mode includes one or more of the SFN mode, a TDM mode, or a single TCI state mode.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
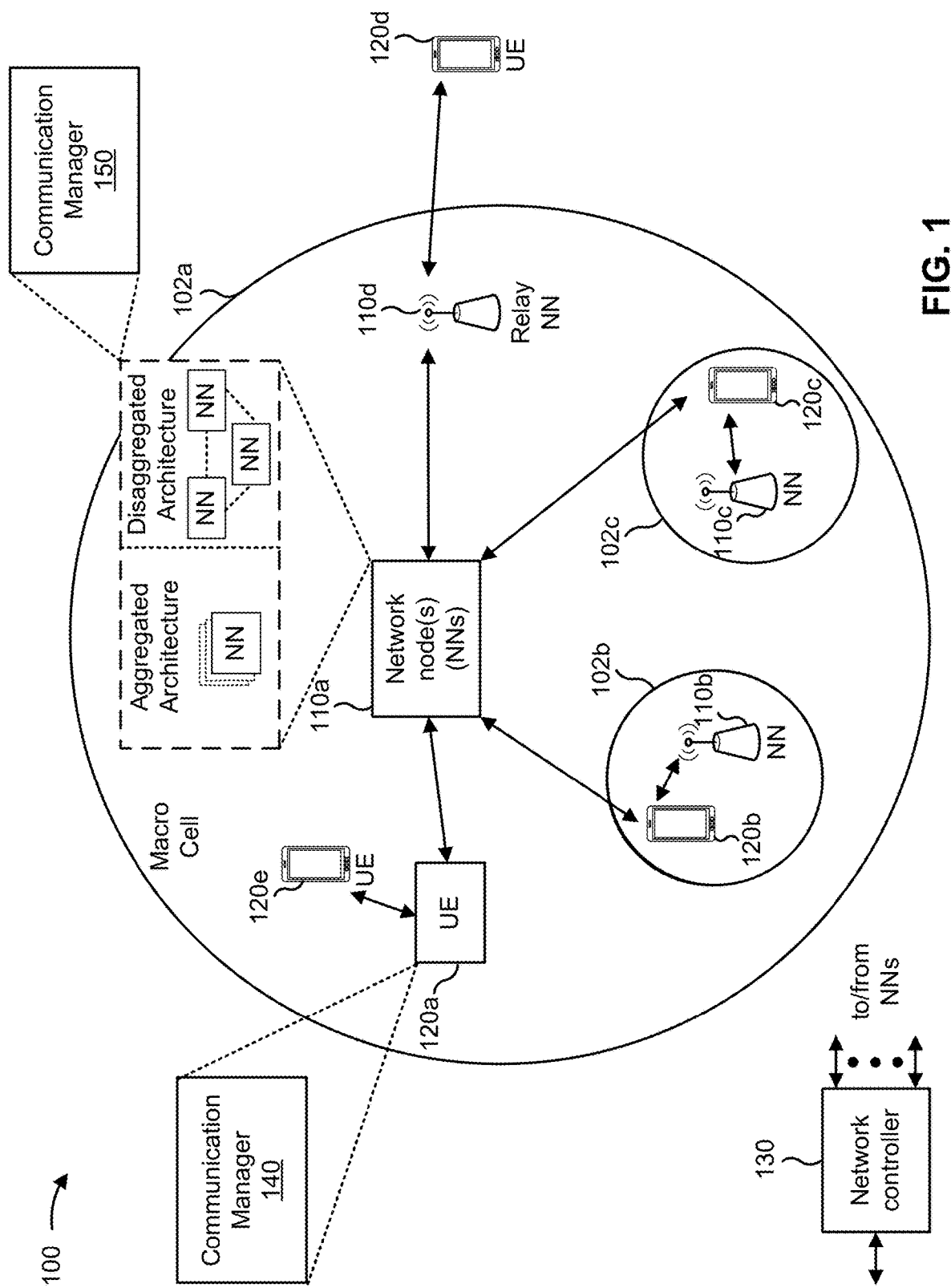
FIG. 1 is a diagram illustrating an example of a wireless network, in accordance with the present disclosure.

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used. A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (for example, a network node 110 or a UE 120) and send a transmission of the data to a downstream node (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay base station, a relay network node, a relay node, or a relay, among other examples.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node 110, configuration information that indicates one or more physical uplink control channel (PUCCH) resources that support a single frequency network (SFN) mode; receive, from the network node 110, beam information that indicates a plurality of transmission configuration indication (TCI) states to apply to transmit a PUCCH using a PUCCH resource associated with a PUCCH format; determine a transmission mode in which to transmit the PUCCH based at least in part on the beam information, wherein the transmission mode includes one or more of the SFN mode, a time division multiplexing (TDM) mode, or a single TCI state mode; and transmit, to the network node 110, the PUCCH using the transmission mode. Additionally, or alternatively, the communication manager 140 may perform one or more other operations described herein.

In some aspects, the network node 110 may include a communication manager 150. As described in more detail elsewhere herein, the communication manager 150 may transmit, to a UE 120, configuration information that indicates one or more PUCCH resources that support an SFN mode; transmit, to the UE 120, beam information that indicates a plurality of TCI states to apply to transmit a PUCCH using a PUCCH resource associated with a PUCCH format; and receive, from the UE 120, the PUCCH in a transmission mode that is based at least in part on the beam information, wherein the transmission mode includes one or more of the SFN mode, a TDM mode, or a single TCI state mode. Additionally, or alternatively, the communication manager 150 may perform one or more other operations described herein.

As indicated above, FIG. 1 is provided as an example. Other examples may differ from what is described with regard to FIG. 1.

Figure 2:
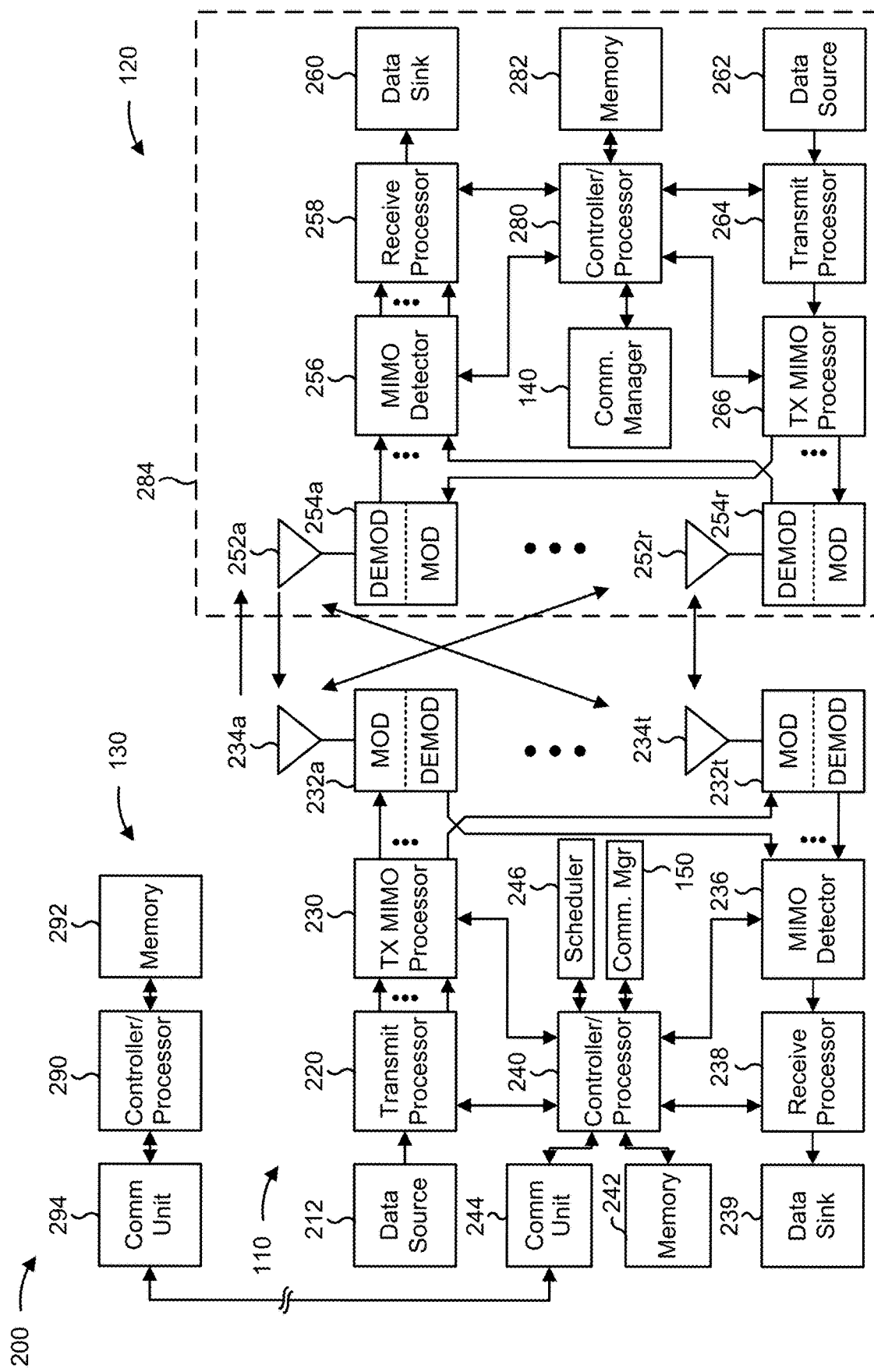
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator.

In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein (e.g., with reference to FIGS. 8-12).

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the ULE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein (e.g., with reference to FIGS. 8-12).

In some aspects, the controller/processor 280 may be a component of a processing system. A processing system may generally be a system or a series of machines or components that receives inputs and processes the inputs to produce a set of outputs (which may be passed to other systems or components of, for example, the UE 120). For example, a processing system of the UE 120 may be a system that includes the various other components or subcomponents of the UE 120.

The processing system of the UE 120 may interface with one or more other components of the UE 120, may process information received from one or more other components (such as inputs or signals), or may output information to one or more other components. For example, a chip or modem of the UE 120 may include a processing system, a first interface to receive or obtain information, and a second interface to output, transmit, or provide information. In some examples, the first interface may be an interface between the processing system of the chip or modem and a receiver, such that the UE 120 may receive information or signal inputs, and the information may be passed to the processing system. In some examples, the second interface may be an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit, or provide information.

In some aspects, the controller/processor 240 may be a component of a processing system. A processing system may generally be a system or a series of machines or components that receives inputs and processes the inputs to produce a set of outputs (which may be passed to other systems or components of, for example, the network node 110). For example, a processing system of the network node 110 may be a system that includes the various other components or subcomponents of the network node 110.

The processing system of the network node 110 may interface with one or more other components of the network node 110, may process information received from one or more other components (such as inputs or signals), or may output information to one or more other components. For example, a chip or modem of the network node 110 may include a processing system, a first interface to receive or obtain information, and a second interface to output, transmit, or provide information. In some examples, the first interface may be an interface between the processing system of the chip or modem and a receiver, such that the network node 110 may receive information or signal inputs, and the information may be passed to the processing system. In some examples, the second interface may be an interface between the processing system of the chip or modem and a transmitter, such that the network node 110 may transmit information output from the chip or modem. A person having ordinary skill in the art will readily recognize that the second interface also may obtain or receive information or signal inputs, and the first interface also may output, transmit, or provide information.

The controller/processor 240 of the network node 110, the controller/processor 280 of the UE 120, or any other component(s) of FIG. 2 may perform one or more techniques associated with SFN and TDM PUCCH, as described in more detail elsewhere herein. For example, the controller/processor 240 of the network node 110, the controller/processor 280 of the UE 120, or any other component(s) (or combinations of components) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving, from the network node 110, configuration information that indicates one or more PUCCH resources that support an SFN mode; means for receiving, from the network node 110, beam information that indicates a plurality of TCI states to apply to transmit a PUCCH using a PUCCH resource associated with a PUCCH format; means for determining a transmission mode in which to transmit the PUCCH based at least in part on the beam information, wherein the transmission mode includes one or more of the SFN mode, a TDM mode, or a single TCI state mode; and/or means for transmitting, to the network node 110, the PUCCH using the transmission mode. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to the UE 120, configuration information that indicates one or more PUCCH resources that support an SFN mode; means for transmitting, to the UE 120, beam information that indicates a plurality of TCI states to apply to transmit a PUCCH using a PUCCH resource associated with a PUCCH format; and/or means for receiving, from the UE 120, the PUCCH in a transmission mode that is based at least in part on the beam information, wherein the transmission mode includes one or more of the SFN mode, a TDM mode, or a single TCI state mode. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (for example, within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
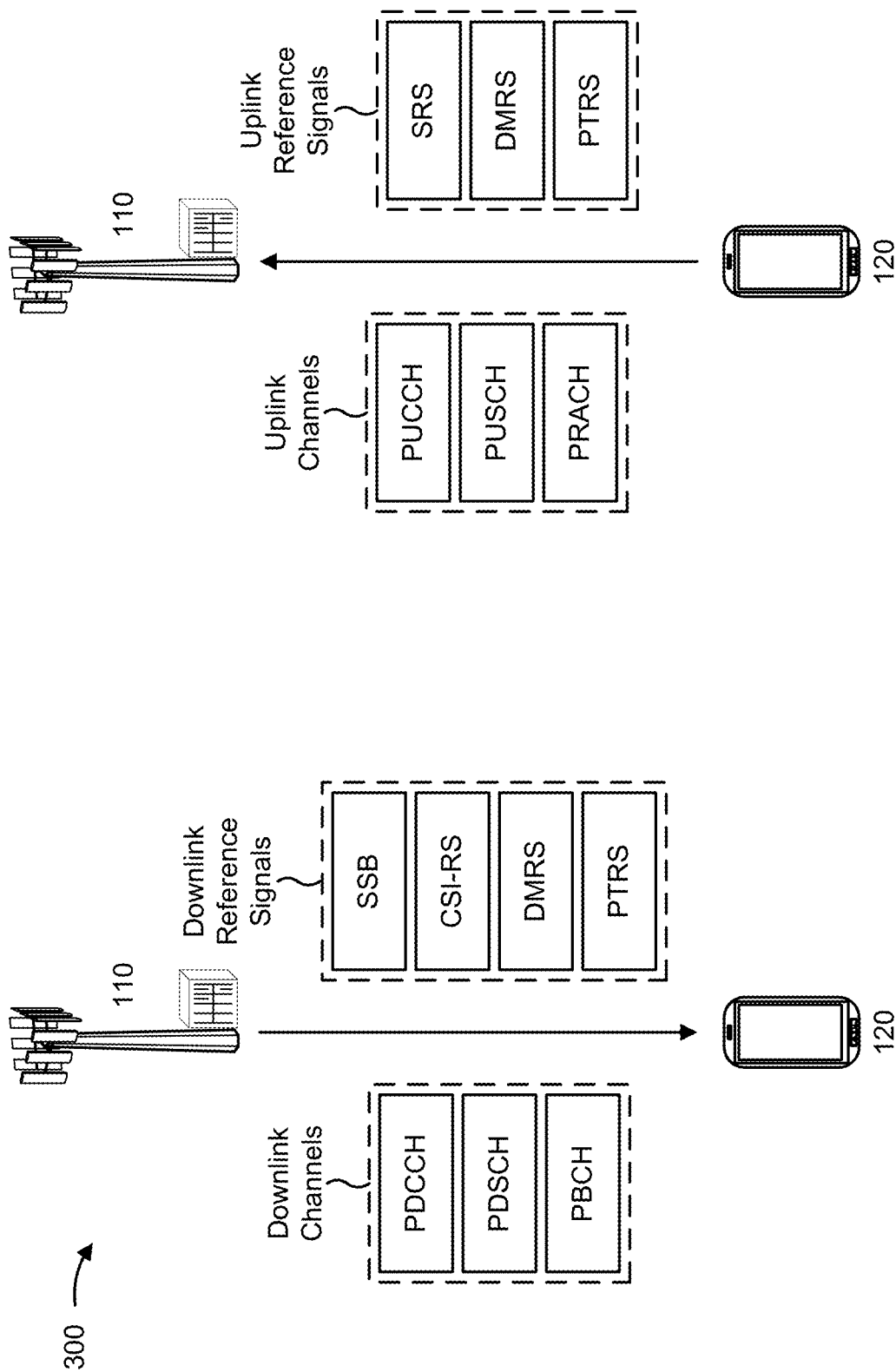
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a PUCCH that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., hybrid automatic repeat request ACK (HARQ-ACK) feedback, ACK/NACK feedback or ACK/NACK information), channel state information (CSI), a scheduling request, and/or other suitable control information in UCI on the PUCCH and/or the PUSCH.

As further shown, a downlink reference signal may include a synchronization signal block (SSB), a CSI reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
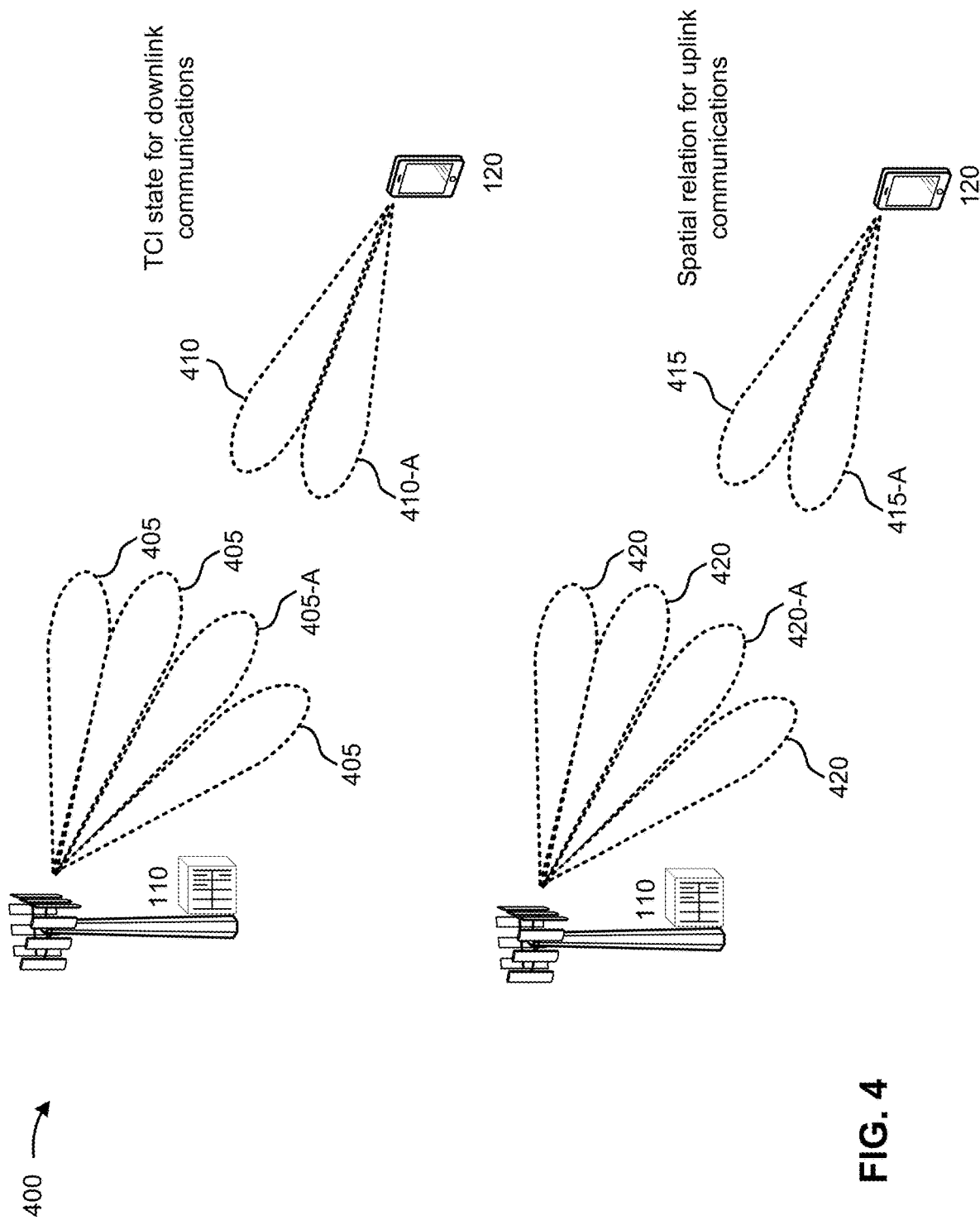
FIG. 4 is a diagram illustrating an example of using beams for communications between a network node and a UE, in accordance with the present disclosure.

FIG. 4 is a diagram illustrating an example 400 of using beams for communications between a network node and a UE, in accordance with the present disclosure. As shown in FIG. 4, a network node 110 and a UE 120 may communicate with one another.

The network node 110 may transmit to UEs 120 located within a coverage area of the network node 110. The network node 110 and the UE 120 may be configured for beamformed communications, where the network node 110 may transmit in the direction of the UE 120 using a directional downlink transmit beam, and the UE 120 may receive the transmission using a directional downlink receive beam. Each downlink transmit beam may have an associated beam ID, beam direction, or beam symbols, among other examples. The network node 110 may transmit downlink communications via one or more downlink transmit beams 405.

The UE 120 may attempt to receive downlink transmissions via one or more downlink receive beams 410, which may be configured using different beamforming parameters at receive circuitry of the UE 120. The UE 120 may identify a particular downlink transmit beam 405, shown as downlink transmit beam 405-A, and a particular downlink receive beam 410, shown as downlink receive beam 410-A, that provide relatively favorable performance (for example, that have a best channel quality of the different measured combinations of downlink transmit beams 405 and downlink receive beams 410). In some examples, the UE 120 may transmit an indication of which downlink transmit beam 405 is identified by the UE 120 as a preferred downlink transmit beam, which the network node 110 may select for transmissions to the UE 120. The UE 120 may thus attain and maintain a beam pair link (BPL) with the network node 110 for downlink communications (for example, a combination of the downlink transmit beam 405-A and the downlink receive beam 410-A), which may be further refined and maintained in accordance with one or more established beam refinement procedures.

A downlink beam, such as a downlink transmit beam 405 or a downlink receive beam 410, may be associated with a TCI state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or spatial receive parameters, among other examples. In some examples, each downlink transmit beam 405 may be associated with an SSB, and the UE 120 may indicate a preferred downlink transmit beam 405 by transmitting uplink transmissions in resources of the SSB that are associated with the preferred downlink transmit beam 405. A particular SSB may have an associated TCI state (for example, for an antenna port or for beamforming). The network node 110 may, in some examples, indicate a downlink transmit beam 405 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a downlink receive beam 410 at the UE 120. Thus, the UE 120 may select a corresponding downlink receive beam 410 from a set of BPLs based at least in part on the network node 110 indicating a downlink transmit beam 405 via a TCI indication.

The network node 110 may maintain a set of activated TCI states for downlink shared channel transmissions and a set of activated TCI states for downlink control channel transmissions. The set of activated TCI states for downlink shared channel transmissions may correspond to beams that the network node 110 uses for downlink transmission on a PDSCH. The set of activated TCI states for downlink control channel communications may correspond to beams that the network node 110 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the network node 110 using a directional uplink transmit beam, and the network node 110 may receive the transmission using a directional uplink receive beam. Each uplink transmit beam at the UE 120 may have an associated beam ID, beam direction, or beam symbols, among other examples. The UE 120 may transmit uplink communications via one or more uplink transmit beams 415.

The network node 110 may receive uplink transmissions via one or more uplink receive beams 420. The network node 110 may identify a particular uplink transmit beam 415, shown as uplink transmit beam 415-A, and a particular uplink receive beam 420, shown as uplink receive beam 420-A, that provide relatively favorable performance (for example, that have a best channel quality of the different measured combinations of uplink transmit beams 415 and uplink receive beams 420). In some examples, the network node 110 may transmit an indication of which uplink transmit beam 415 is identified by the network node 110 as a preferred UE transmit beam, which the network node 110 may select for transmissions from the UE 120. The UE 120 and the network node 110 may thus attain and maintain a BPL for uplink communications (for example, a combination of the uplink transmit beam 415-A and the uplink receive beam 420-A), which may be further refined and maintained in accordance with one or more established beam refinement procedures. An uplink beam, such as an uplink transmit beam 415 or an uplink receive beam 420, may be associated with a spatial relation. A spatial relation may indicate a directionality or a characteristic of the uplink beam, similar to one or more QCL properties, as described above.

As indicated above, FIG. 4 is provided as an example. Other examples may differ from what is described with respect to FIG. 4.

Figure 5:
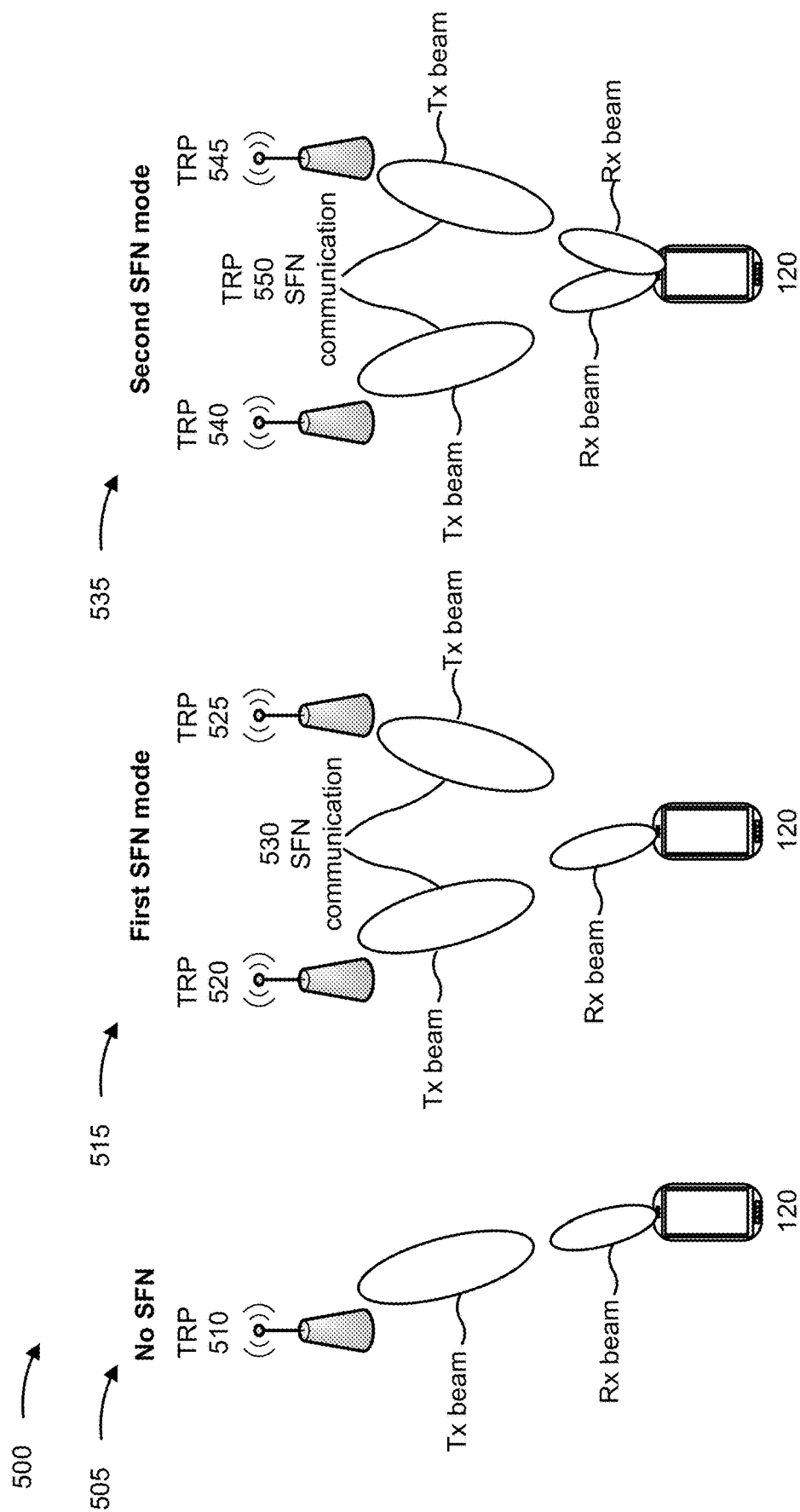
FIG. 5 is a diagram illustrating an example associated with single frequency network (SFN) communication, in accordance with the present disclosure

FIG. 5 is a diagram illustrating an example 500 associated with SFN communication, in accordance with the present disclosure.

In some cases, a UE 120 may operate in an SFN. An SFN may be a network configuration in which multiple cells (e.g., multiple network nodes or multiple cells associated with a single network node) simultaneously transmit the same signal over the same frequency channel. As used herein, "SFN transmissions" may refer to two or more transmissions that are transmitted using the same (or substantially the same) time domain resources and frequency domain resources (e.g., resources that partially or fully overlap in a time domain and a frequency domain). For example, an SFN may be a broadcast network. An SFN may enable an extended coverage area without the use of additional frequencies. For example, an SFN configuration may include multiple network nodes in an SFN area that transmit one or more identical signals using the same frequency at the same, or substantially the same, time. In some aspects, an SFN configuration may include other network devices, such as multiple TRPs corresponding to the same network node. A TRP may include a network node 110, a DU, and/or an RU, among other examples. The multiple TRPs may provide coverage for an SFN area. The multiple TRPs may transmit one or more identical signals using the same frequency at the same, or substantially the same, time. In some examples, the identical signal(s) simultaneously transmitted by the multiple network nodes (and/or multiple TRPs) may include a PDSCH signal, a CORESET scheduling the PDSCH, and/or a reference signal (e.g., an SSB, a CSI-RS, a tracking reference signal (TRS), or other reference signals), among other examples.

As shown by reference number 505, an example of downlink communications that do not use an SFN configuration is depicted. A TRP 510 may transmit communications using a transmit beam to the UE 120. The transmit beam may be associated with a TCI state. The UE 120 may receive communications (e.g., transmitted by the TRP 510) using a receive beam. For example, the UE 120 may identify the TCI state associated with the transmit beam and may use information provided by the TCI state to receive the communications using the receive beam.

As shown by reference number 515, an example of a first SFN mode is depicted. As shown by reference number 515, a first TRP 520 (or a first network node 110) and a second TRP 525 (or a second network node 110) may transmit an SFN communication 530 to the UE 120. For example, the first TRP 520 and the second TRP 525 may transmit substantially the same information (e.g., the SFN communication 530) to the UE 120 using the same frequency domain resources and the same time domain resources. The first TRP 520 may transmit the SFN communication 530 using a first transmit beam. The second TRP 525 may transmit the SFN communication 530 using a second transmit beam. In the first SFN mode, the UE 120 may be unaware that the SFN communication 530 is transmitted on separate transmit beams (e.g., from different TRPs and/or different network nodes 110). Accordingly, when the multiple network nodes (and/or multiple TRPs) simultaneously transmit the same signal to a UE 120, the SFN configuration may be transparent to the UE 120, and the UE 120 may aggregate, or accumulate, the simultaneous signal transmissions from the multiple TRPs (and/or multiple network nodes 110), which may provide higher signal quality or higher tolerance for multipath attenuation, among other benefits. For example, the UE 120 may receive the SFN communication 530 using a single receive beam (e.g., may use a single spatial receive direction, among other examples, to receive the SFN communication 530). In other words, TCI states of the different transmit beams used to transmit the SFN communication 530 may not be signaled to the UE 120.

As shown by reference number 535, an example of a second SFN mode is depicted. As shown in FIG. 5, a first TRP 540 (or a first network node 110) and a second TRP 545 (or a second network node 110) may transmit an SFN communication 550 to the UE 120. For example, the first TRP 540 and the second TRP 545 may transmit substantially the same information (e.g., the SFN communication 550) to the UE 120 using the same frequency domain resources and the same time domain resources. The first TRP 540 may transmit the SFN communication 550 using a first transmit beam. The second TRP 545 may transmit the SFN communication 550 using a second transmit beam. In the second SFN mode, the UE 120 may be aware that the SFN communication 550 is transmitted on separate transmit beams (e.g., from different TRPs and/or different network nodes 110). For example, a first TCI state of the first transmit beam (e.g., associated with the first TRP 540) and a second TCI state of the second transmit beam (e.g., associated with the second TRP 545) may be signaled to the UE 120. For example, a network node 110 may transmit configuration information (e.g., directly to the UE 120 or indirectly via one or more network nodes) that indicates that the SFN communication 550 may be a combination of transmissions from different TRPs and/or different transmit beams. The UE 120 may use the information associated with the different TRPs and/or different transmit beams (e.g., the first TCI state and the second TCI state) to improve reception performance for the SFN communication 550. For example, as shown by reference number 535, the UE 120 may use different spatial directions (e.g., different downlink receive beams) to receive the SFN communication 550 based at least in part on the TCI states of the transmit beam(s) associated with the SFN communication 550. This may improve a performance of the UE 120 because the UE 120 may receive the SFN communication 550 from different transmit beams and/or different TRPs with improved signal strength and/or signal quality, among other examples.

As indicated above, FIG. 5 is provided as an example. Other examples may differ from what is described with respect to FIG. 5.

Figure 6:
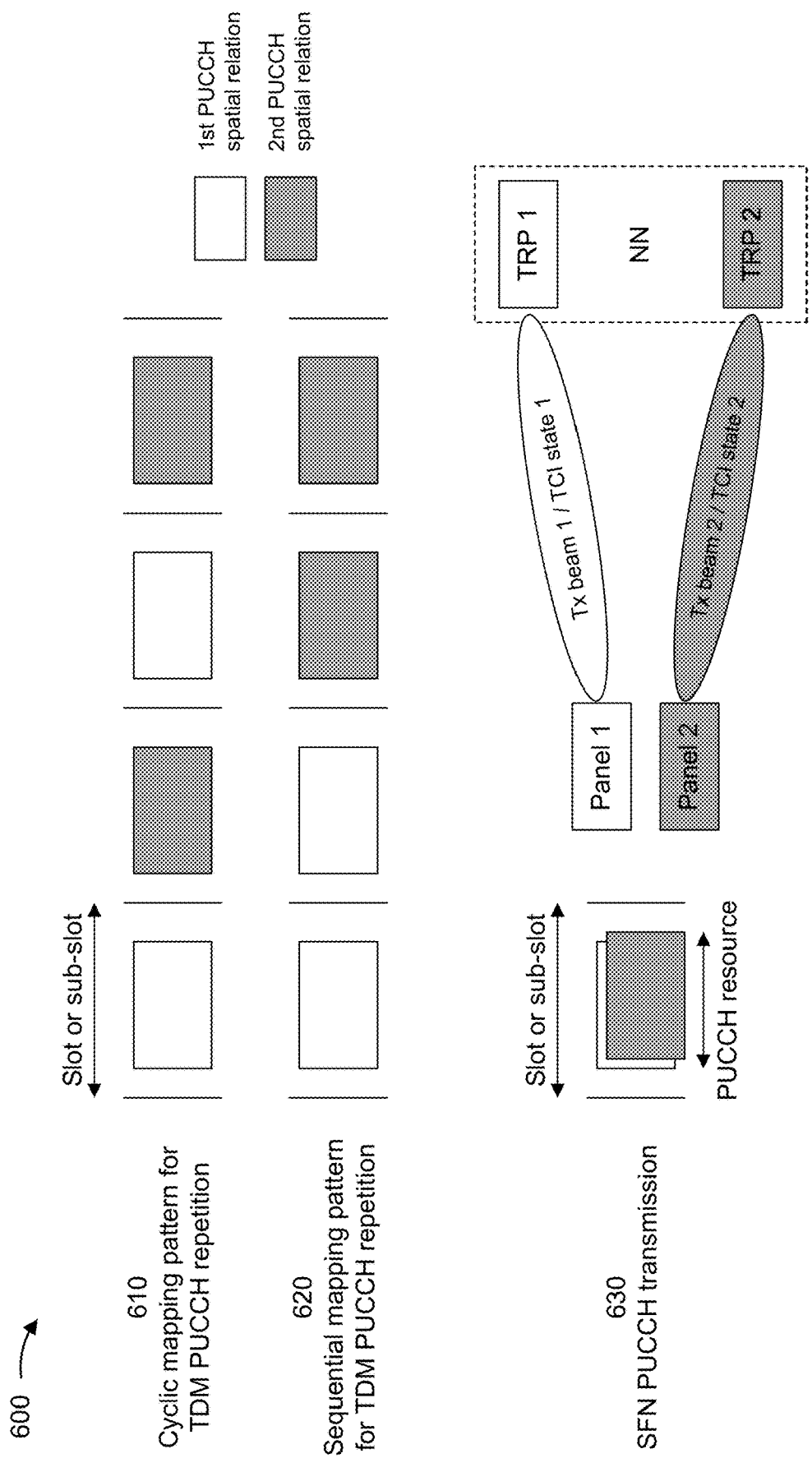
FIG. 6 is a diagram illustrating an example of physical uplink control channel (PUCCH) transmission using different beams, in accordance with the present disclosure.

FIG. 6 is a diagram illustrating an example 600 of PUCCH transmission using different beams, in accordance with the present disclosure. For example, a UE may transmit a PUCCH communication to a network node using different beams in order to increase reliability and/or robustness (e.g., to increase a likelihood that the network node will be able to successfully receive and decode the PUCCH communication). For example, as described herein, a UE may transmit a PUCCH communication using different beams and/or transmission parameters in different transmission occasions, using multiple panels in the same transmission occasion, and/or to multiple TRPs, among other examples. In this way, the UE reduces a likelihood that an interruption to a PUCCH transmission on a wireless link causes the PUCCH communication to be dropped (e.g., as a result of an object physically blocking a transmission path on the wireless link and/or other communications interfering with the wireless link).

For example, referring to FIG. 6, reference numbers 610 and 620 depict examples of a time division multiplexing (TDM) mode in which a UE may transmit multiple repetitions of a PUCCH communication with different transmission parameters (e.g., using different spatial relations that correspond to different beams and/or different power control parameters) in different transmission time intervals (e.g., different slots for inter-slot PUCCH repetition or different sub-slots for intra-slot PUCCH repetition). For example, a network node may activate multiple (e.g., two) spatial relations or multiple sets of power control parameters per PUCCH resource (e.g., a set of time and frequency resources used to transmit a PUCCH) using a medium access control (MAC) control element (MAC-CE). Accordingly, in cases where the UE is configured or scheduled to transmit multiple repetitions of a PUCCH communication using a PUCCH resource in different slots, sub-slots, or other transmission time intervals, the multiple spatial relations (or multiple beams or sets of power control parameters) that the network node activated for the PUCCH resource may be applied to corresponding sets of repetitions of the PUCCH communication. In some aspects, the number of repetitions of the PUCCH communication may be configured per PUCCH resource and/or per PUCCH format. For example, a PUCCH resource used to transmit a PUCCH communication may be associated with a PUCCH format that defines a number of symbols occupied by the PUCCH resource, a number of bits included in a UCI payload carried in a PUCCH communication transmitted using the PUCCH resource, and/or other suitable information (e.g., the number of PUCCH repetitions).

Furthermore, in the TDM mode, a PUCCH configuration parameter that provides a common configuration for all PUCCH resources and all PUCCH formats (e.g., in a given uplink bandwidth part associated with a given component carrier or serving cell and physical layer priority) may be used to configure a mapping pattern for the multiple repetitions of the PUCCH communication. For example, in FIG. 6, reference number 610 depicts an example of a cyclic mapping pattern that may be applied in the TDM mode, where the UE alternates between a first beam corresponding to a first spatial relation (e.g., a first PUCCHSpatialRelationInfoId) and a second beam corresponding to a second spatial relation (e.g., a second PUCCHSpatialRelationInfoId) across repetitions. For example, as shown by reference number 610, a UE following a cyclic mapping pattern to transmit four repetitions of a PUCCH communication may transmit a first repetition of the PUCCH communication using a first beam in a first slot or sub-slot, a second repetition of the PUCCH communication using a second beam in a second slot or sub-slot, a third repetition of the PUCCH communication using the first beam in a third slot or sub-slot, and a fourth repetition of the PUCCH communication using the second beam in a fourth slot or sub-slot. Alternatively, as shown by reference number 620, a sequential mapping pattern may be applied for the multiple repetitions of the PUCCH communication, in which case the UE may switch beams after transmitting multiple repetitions of the PUCCH communication. For example, as shown by reference number 620, a UE following a sequential mapping pattern to transmit four repetitions of a PUCCH communication may transmit two repetitions of the PUCCH communication using a first beam in a first slot or sub-slot and a second slot or sub-slot, and may then transmit two repetitions of the PUCCH communication using a second beam in a third slot or sub-slot and a fourth slot or sub-slot.

In some aspects, in cases where a UE is configured to transmit multiple repetitions of a PUCCH communication in the TDM mode using a cyclic mapping pattern or a sequential mapping pattern, the TDM-based repetitions may be applied to a dynamic PUCCH (e.g., a PUCCH scheduled by DCI) or to a periodic PUCCH (e.g., an RRC-configured PUCCH, such as a PUCCH configured to carry periodic CSI (P-CSI) or a scheduling request, or a PUCCH activated by a MAC-CE, such as a PUCCH configured to carry semi-persistent CSI (SP-CSI)). In cases where the TDM-based repetitions are applied to a dynamic PUCCH scheduled by DCI, a downlink DCI message (e.g., having DCI format 1_1 or 1_2) may include a PUCCH resource indicator (PRI) field to indicate the PUCCH resource used for transmitting corresponding HARQ-ACK feedback (e.g., for a PDSCH scheduled by the downlink DCI message).

Additionally, or alternatively, reference number 630 depicts an example of transmitting a PUCCH communication using different beams in an SFN mode. For example, in the SFN mode, the UE may transmit the same PUCCH communication (e.g., identical copies of the PUCCH communication) at the same time using different beams, different TCI states, and/or different power control parameters (e.g., from two panels of the UE). In such cases, the different beams may be applied to one PUCCH resource (e.g., the same set of time and frequency resources), whereby a set of control resource elements (REs) (e.g., a sequence of coded bits carrying UCI) in the PUCCH resource is simultaneously transmitted using the different beams. Furthermore, in cases where the PUCCH resource is associated with a PUCCH format in which a DMRS is transmitted with the PUCCH communication, the DMRS in the PUCCH resource is simultaneously transmitted using the different beams. For example, as shown by reference number 630, a UE may use a first transmit beam or a first TCI state to transmit a PUCCH communication to a first TRP in a PUCCH resource, and may simultaneously use a second transmit beam or a second TCI state to transmit the PUCCH communication to a second TRP in the same PUCCH resource. Accordingly, in the SFN mode, a PUCCH resource may be defined according to a number of OFDM symbols in a time domain, a number of resource blocks (RBs) in a frequency domain, and a PUCCH format used for the PUCCH communication.

As indicated above, FIG. 6 is provided as an example. Other examples may differ from what is described with respect to FIG. 6.

Figure 7:
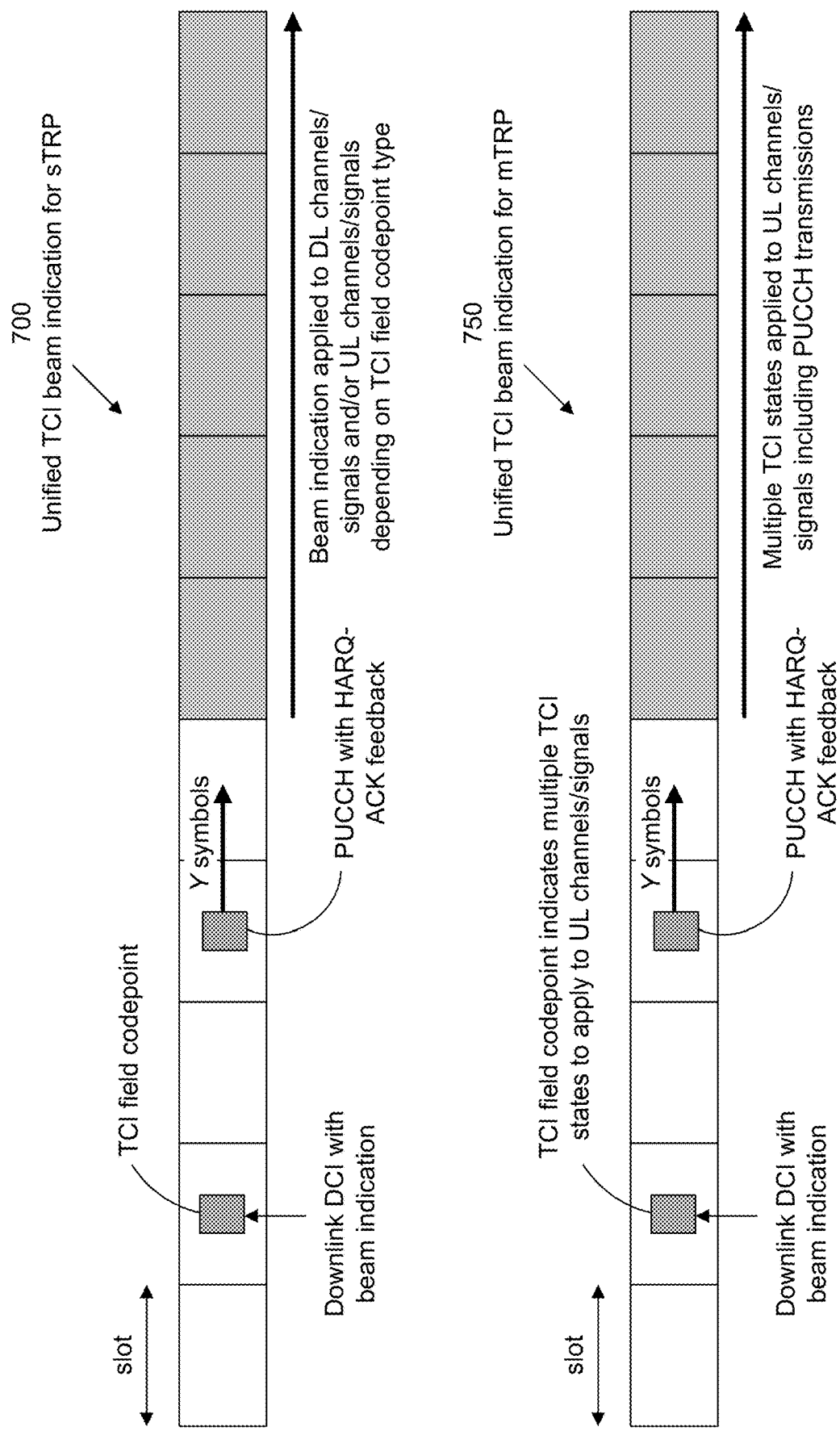
FIG. 7 is a diagram illustrating examples of communication using a unified transmission configuration indication (TCI) framework, in accordance with the present disclosure.

FIG. 7 is a diagram illustrating examples 700, 750 of communication using a unified TCI framework, in accordance with the present disclosure. For example, as described above, an uplink beam, such as an uplink transmit beam that a UE uses to transmit an uplink communication or an uplink receive beam that a network node uses to receive an uplink communication, may be associated with a spatial relation that indicates a directionality or a characteristic of the uplink beam, similar to one or more QCL properties. Additionally, or alternatively, a network node and a UE may communicate using a unified TCI framework, in which case the network node may indicate a TCI state that the UE is to use for beamformed uplink communications.

For example, in a unified TCI framework, a joint TCI state (which may be referred to as a joint downlink and uplink TCI state) may be used to indicate a common beam that the UE is to use for downlink communication and uplink communication. In this case, the joint downlink and uplink TCI state may include at least one source reference signal to provide a reference (or UE assumption) for determining QCL properties for a downlink communication or a spatial filter for uplink communication. For example, the joint downlink and uplink TCI state may be associated with one or more source reference signals that provide common QCL information for UE-dedicated PDSCH reception and one or more CORESETs in a component carrier, or one or more source reference signals that provide a reference to determine one or more common uplink transmission spatial filters for a PUSCH based on a dynamic grant or a configured grant or one or more dedicated PUCCH resources in a component carrier.

Additionally, or alternatively, the unified TCI framework may support a separate downlink TCI state and a separate uplink TCI state to accommodate separate downlink and uplink beam indications (e.g., in cases where a best uplink beam does not correspond to a best downlink beam, or vice versa). In such cases, each valid uplink TCI state configuration may contain a source reference signal to indicate an uplink transmit beam for a target uplink communication (e.g., a target uplink reference signal or a target uplink channel). For example, the source reference signal may be an SRS, an SSB, or a CSI-RS, among other examples, and the target uplink communication may be a PRACH, a PUCCH, a PUSCH, an SRS, and/or a DMRS (e.g., for a PUCCH or a PUSCH), among other examples. In this way, supporting joint TCI states or separate downlink and uplink TCI states may enable a unified TCI framework for downlink and uplink communications and/or may enable the network node to indicate various uplink QCL relationships (e.g., Doppler shift, Doppler spread, average delay, or delay spread, among other examples) for uplink TCI communication.

For example, referring to FIG. 7, example 750 depicts a unified TCI beam indication that may be used for uplink communication in a single TRP (sTRP) mode, where a network node provides a TCI state indication to indicate an uplink beam that a UE is to use to transmit an uplink communication to a particular TRP. For example, in the sTRP mode, downlink TCI states, uplink TCI states, and/or joint downlink and uplink TCI states may be configured using RRC signaling, and a MAC-CE may be used to provide a beam indication and/or to activate a subset of the RRC-configured TCI states such that DCI can provide a beam indication for one of the TCI states in the activated subset of TCI states. For example, in some aspects, the MAC-CE may indicate a mapping to one or more TCI field codepoints, where each respective TCI field codepoint may represent a joint downlink and uplink TCI state (e.g., used for a joint downlink and uplink beam indication), a TCI state pair including a downlink TCI state and an uplink TCI state (e.g., used for separate downlink and uplink beam indications), a downlink TCI state only (e.g., used for a downlink-only beam indication), or an uplink TCI state only (e.g., used for an uplink-only beam indication). In cases where the MAC-CE indicates a mapping to only a single TCI field codepoint, the MAC-CE may serve as a beam indication to be applied starting from the first slot that is a configured or specified duration (e.g., 3 milliseconds) after transmission of HARQ-ACK feedback for a PDSCH carrying the MAC-CE.

Alternatively, as shown by example 700, the MAC-CE may indicate a mapping to multiple TCI field codepoints, and downlink DCI (e.g., having DCI format 1_1 or DCI format 1_2) can indicate a beam via a TCI field codepoint field with or without a downlink assignment. In this case, the beam indication provided in the TCI field codepoint may be a sticky beam indication (e.g., a beam indication that is unrelated to any scheduled channel). Furthermore, as shown by example 700, the beam indication may be applied starting from the first slot that is at least Y symbols after the last symbol of the PUCCH that carries HARQ-ACK feedback for the DCI carrying the beam indication, where Y has an RRC-configured value based on a UE capability that is signaled to the network node. For example, depending on the type of the TCI field codepoint (e.g., whether the TCI field codepoint is used for a joint downlink and uplink beam indication, a separate downlink and uplink beam indication, a downlink-only beam indication, or an uplink-only beam indication), the beam indication may be applied to downlink channels and/or signals and/or to uplink channels and/or signals starting from the first slot that is at least Y symbols after the last symbol of the PUCCH that carries the HARQ-ACK feedback.

In some aspects, example 750 depicts an extension of the unified TCI framework to enable multiple TRP (mTRP) techniques, which may be used to support PUCCH repetitions with different beams in a TDM mode and/or an SFN mode. For example, similar to the sTRP mode, downlink TCI states, uplink TCI states, and/or joint downlink and uplink TCI states may be configured using RRC signaling, and a MAC-CE may be used to provide a beam indication and/or to activate a subset of the RRC-configured TCI states such that DCI can provide a beam indication for two of the TCI states in the activated subset of TCI states (although it will be appreciated that the same or similar techniques may be applied to provide a beam indication for more than two TCI states). For example, to provide an uplink beam indication in an mTRP configuration, a MAC-CE may indicate a mapping to one or more TCI field codepoints, where each respective TCI field codepoint may represent two TCI states that are applicable to uplink channels and/or uplink signals. In such cases, each TCI field codepoint may represent two joint downlink and uplink TCI states, two TCI state pairs including two downlink TCI states and two uplink TCI states, one downlink TCI state and two uplink TCI states, or one joint downlink and uplink TCI state and one uplink TCI state. In cases where the MAC-CE indicates a mapping to only a single TCI field codepoint, the MAC-CE may serve as a beam indication, and the two TCI states are applied starting from the first slot that is a configured or specified duration after transmission of HARQ-ACK feedback for a PDSCH carrying the MAC-CE.

Alternatively, as shown by example 750, the MAC-CE may indicate a mapping to multiple TCI field codepoints, and downlink DCI (e.g., having DCI format 1_1 or DCI format 1_2) can indicate two TCI states to be applied for uplink channels and/or signals via a TCI field codepoint field with or without a downlink assignment. In this case, as shown by example 750, the two TCI states may be applied to uplink channels and/or uplink signals starting from the first slot that is at least Y symbols after the last symbol of the PUCCH that carries HARQ-ACK feedback for the DCI carrying the beam indication, where Y has an RRC-configured value based on a UE capability that is signaled to the network node. For example, the two TCI states may be applied to PUCCH transmissions that may include multiple PUCCH repetitions that are associated with different TCI states according to a cyclic or sequential TDM mapping pattern and/or to simultaneous SFN PUCCH transmissions using different beams.

As indicated above, FIG. 7 is provided as an example. Other examples may differ from what is described with respect to FIG. 7.

Figure 8:
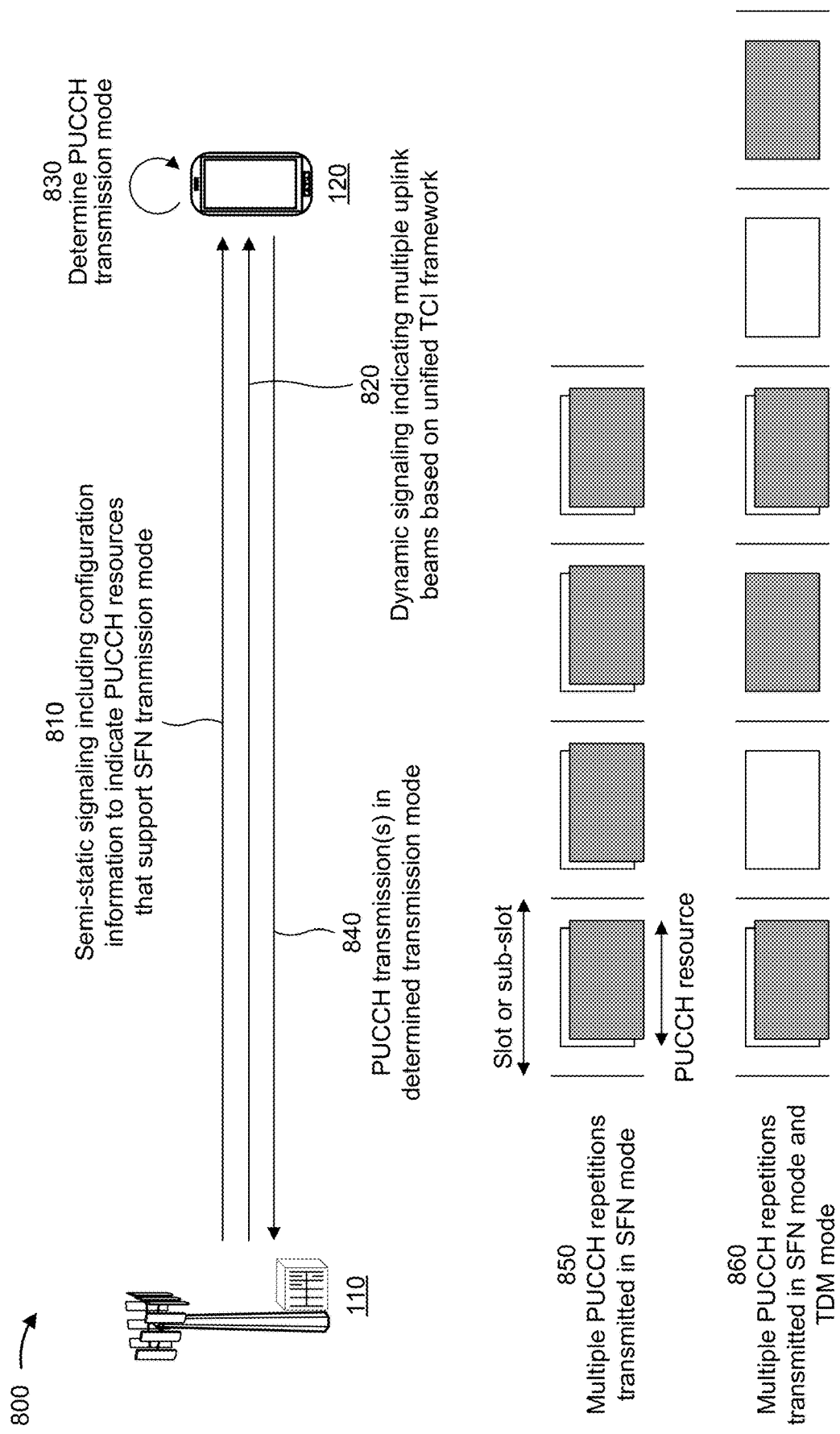
FIG. 8 is a diagram illustrating an example associated with SFN and time division multiplexing (TDM) PUCCH, in accordance with the present disclosure.

FIG. 8 is a diagram illustrating an example 800 associated with SFN and TDM PUCCH, in accordance with the present disclosure. As shown in FIG. 8, example 800 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink. Furthermore, in some aspects, the network node 110 may include multiple TRPs (e.g., a first TRP and a second TRP) that may communicate with the UE 120 on the uplink and/or downlink.

In some aspects, as described herein, example 800 relates to techniques that may be used to enable the UE 120 to transmit a PUCCH using one or more transmission modes, which may include a TDM mode in which the PUCCH is transmitted in multiple repetitions using different beams (e.g., one beam per transmission time interval), an SFN mode in which the PUCCH is simultaneously transmitted in one or more repetitions using different beams (e.g., multiple beams per transmission time interval), and/or a single TCI state mode in which the PUCCH is transmitted in one or more repetitions using a single beam. Accordingly, some aspects described herein relate to techniques to configure or otherwise enable PUCCH transmission in the SFN mode, which may include RRC configurations to indicate one or more PUCCH resources that support PUCCH transmission in the SFN mode (e.g., when a plurality of uplink beams are indicated in a MAC-CE or DCI that carries a beam indication). Furthermore, some aspects described herein relate to techniques to indicate a plurality of uplink beams based on a unified TCI framework, where a MAC-CE or DCI indicates a plurality of uplink TCI states or a plurality of joint downlink and uplink TCI states to be applied to uplink channels and/or signals (e.g., a PUCCH transmission) after an application time. Furthermore, because the TDM mode and the SFN mode each utilize multiple beams, some aspects described herein relate to techniques that the UE 120 may use to distinguish between the TDM mode and the SFN mode when two uplink beams or TCI states are applied to one or more PUCCH resources and/or to enable PUCCH transmission using a combination of the TDM, SFN, and/or single TCI state modes.

More particularly, as shown by reference number 810, the network node 110 may transmit, and the UE 120 may receive, semi-static (e.g., RRC) signaling that includes configuration information to indicate one or more PUCCH resources that support PUCCH transmission in the SFN mode. For example, in some aspects, the configuration information may be provided in one or more PUCCH configuration information elements (IEs) (e.g., a PUCCH-Config IE), where support for the SFN mode may be configured per PUCCH configuration. In this case, support for PUCCH transmission in the SFN mode may be applied to all PUCCH resources and PUCCH formats in a given uplink bandwidth part in a given component carrier for a given physical layer priority in a serving cell. For example, in an uplink bandwidth part in a component carrier associated with one physical layer priority, the semi-static signaling may include one PUCCH configuration IE to indicate whether the SFN mode is supported for all associated PUCCH resources and PUCCH formats. In cases where there are two physical layer priorities, two PUCCH configuration IEs may be configured in the uplink bandwidth part of the component carrier to separately configure support for the associated PUCCH resources and PUCCH formats for each physical layer priority. Alternatively, in some aspects, the semi-static signaling may configure support for transmitting a PUCCH in the SFN mode per PUCCH format, where a parameter is included in a PUCCH format configuration IE applicable to all PUCCH resources associated with a PUCCH format to indicate whether the SFN mode is supported for all of the associated PUCCH resources. Alternatively, in some aspects, the semi-static signaling may configure support for transmitting a PUCCH in the SFN mode per PUCCH resource, where a parameter is included in a PUCCH resource configuration IE applicable to all PUCCH transmissions that use a PUCCH resource to indicate whether the SFN mode is supported for the associated PUCCH transmissions.

As further shown by reference number 820, the network node 110 may transmit, and the UE 120 may receive, dynamic signaling that includes beam information to indicate multiple uplink beams based on a unified TCI framework. For example, as described herein, the dynamic signaling may include a MAC-CE that includes a TCI field codepoint to indicate multiple joint downlink and uplink TCI states, multiple downlink TCI states and multiple uplink TCI states, one downlink TCI state and multiple uplink TCI states, one or more joint downlink and uplink TCI states and one or more uplink TCI states, or the like. Additionally, or alternatively, the dynamic signaling may include a MAC-CE that activates a set of RRC-configured TCI states and a DCI message that includes a TCI field codepoint to indicate a plurality of uplink TCI states or a plurality of joint downlink and uplink TCI states from the set of RRC-configured TCI states activated by the MAC-CE. In either case, as shown by reference number 830, the UE 120 may determine a transmission mode for a PUCCH transmission based at least in part on the beam information carried in the dynamic signaling indicating multiple TCI states to be applied to uplink channels and/or signals.

For example, in cases where support for PUCCH transmission in the SFN mode is configured per PUCCH configuration (e.g., for all PUCCH resources and PUCCH formats in a given uplink bandwidth part in a given component carrier for a given physical layer priority), the UE 120 may determine that all PUCCH resources associated with the PUCCH configuration are to be transmitted in the SFN mode. Alternatively, in some aspects, the PUCCH configuration IE for the associated uplink bandwidth part, component carrier, and physical layer priority may include a parameter that indicates whether the SFN mode is enabled (e.g., the PUCCH configuration IE may include a PUCCHSFNscheme parameter that has a value of "enabled" to indicate that the SFN mode is enabled). Alternatively, in some aspects, the PUCCH configuration IE for the associated uplink bandwidth part, component carrier, and physical layer priority may include a parameter that indicates a mapping pattern for PUCCH transmission, where the mapping pattern parameter may indicate that PUCCH transmissions are to be performed in the TDM mode with a cyclic mapping pattern, in the TDM mode with a sequential mapping pattern, or in the SFN mode. In this case, the UE 120 may distinguish between the TDM mode and the SFN mode based on the mapping pattern parameter (e.g., the TDM mode is enabled if the mapping pattern parameter indicates a sequential mapping or a cyclic mapping, or the SFN mode is enabled if the mapping pattern parameter indicates an SFN mapping).

Additionally, or alternatively, in cases where support for PUCCH transmission in the SFN mode is configured per PUCCH format (e.g., for all PUCCH resources associated with a given PUCCH format), the UE 120 may determine that all PUCCH resources associated with the corresponding PUCCH format are to be transmitted in the SFN mode based at least in part on the dynamic signaling indicating a plurality of uplink TCI states or a plurality of joint downlink and uplink TCI states. In this case, after the application time associated with the plurality of TCI states indicated in the dynamic signaling, the UE 120 could potentially determine that a first set of PUCCH resources are to use the SFN mode and a second set of PUCCH resources are to use the TDM mode (e.g., where the first set of PUCCH resources are associated with a first PUCCH format for which the SFN mode is enabled and the second set of PUCCH resources are associated with a second PUCCH format for which the SFN mode is not enabled or configured). Accordingly, in cases where support for PUCCH transmission in the SFN mode is configured per PUCCH format, the beam information included in the dynamic signaling may indicate a plurality of beams that are to be used in the TDM mode or a plurality of beams that are to be used in the SFN mode. Furthermore, in cases where neither the TDM mode nor the SFN mode are configured for a PUCCH format and a beam indication indicates multiple uplink TCI states or multiple joint downlink and uplink TCI states, the UE 120 may use one of the multiple TCI states indicated in the beam information in a single TCI state mode.

Additionally, or alternatively, in cases where support for PUCCH transmission in the SFN mode is configured per PUCCH resource (e.g., for all PUCCH transmissions that use a given PUCCH resource), the UE 120 may determine that all PUCCH transmissions that use the PUCCH resource associated with the corresponding PUCCH resource configuration IE are to be transmitted in the SFN mode based at least in part on the dynamic signaling indicating a plurality of uplink TCI states or a plurality of joint downlink and uplink TCI states. In this case, after the application time associated with the plurality of TCI states indicated in the dynamic signaling, the UE 120 could determine that a first set of PUCCH resources are to use the SFN mode and a second set of PUCCH resources are to use the TDM mode in a similar manner as described above for an SFN PUCCH configuration that is defined per PUCCH format (e.g., where the SFN mode is enabled for the first set of PUCCH resources and not enabled or configured for the second set of PUCCH resources). Accordingly, in cases where support for PUCCH transmission in the SFN mode is configured per PUCCH resource, the beam information included in the dynamic signaling may indicate a plurality of beams that are to be used in the TDM mode or a plurality of beams that are to be used in the SFN mode. Furthermore, in cases where neither the TDM mode nor the SFN mode are configured for a PUCCH resource and a beam indication indicates multiple uplink TCI states or multiple joint downlink and uplink TCI states for the PUCCH resource, the UE 120 may use one of the multiple TCI states indicated in the beam information to transmit the PUCCH communication in a single TCI state mode.

Additionally, or alternatively, the UE 120 may determine whether to use the SFN mode, the TDM mode, or the single TCI state mode as the transmission mode for a PUCCH communication based on a type of the PUCCH transmission. For example, whether the UE 120 is to use the SFN mode, the TDM mode, or the single TCI state mode to transmit a PUCCH communication may depend on whether the PUCCH communication is aperiodic (e.g., scheduled by a DCI message), semi-persistent (e.g., activated by a MAC-CE), or periodic (e.g., RRC-configured). For example, in one use case, the SFN mode may be used only to transmit PUCCH communications that use PUCCH resources scheduled by a DCI message (e.g., because HARQ-ACK feedback carried in the PUCCH communication may require a high reliability), and the SFN mode may not be applied to periodic or semi-persistent PUCCH resources (e.g., periodic or semi-persistent CSI on a PUCCH). Furthermore, the same PUCCH resource can be used in different transmission time intervals for HARQ-ACK feedback (e.g., when the PUCCH resource is indicated by the PRI field in a DCI message) and for periodic or semi-persistent CSI transmissions (e.g., the PUCCH resource is RRC-configured in a CSI-ReportConfig parameter). In this case, a PUCCH transmission using the PUCCH resource for HARQ-ACK feedback may be performed in the SFN mode, and a PUCCH transmission that uses the same PUCCH resource to carry periodic or semi-persistent CSI in another transmission time interval may be performed in the TDM mode. In some aspects, in cases where the PUCCH communication is scheduled by a DCI message (e.g., the PUCCH communication carries HARQ-ACK feedback), the DCI message may include a bit that dynamically indicates whether the SFN mode is enabled. For example, to transmit the PUCCH communication in the SFN mode, the associated PUCCH resource may be required to support the SFN mode (e.g., based on one or more of the semi-static signaling options described above) and the DCI message may be required to include a bit to dynamically indicate that the SFN mode is enabled.

As further shown by reference number 840, the UE 120 may transmit, and the network node 110 may receive, the PUCCH communication that is transmitted by the UE 120 in one or more of the SFN mode, the TDM mode, or the single TCI state mode. For example, when the UE 120 receives the dynamic signaling that indicates two uplink TCI states or two joint downlink and uplink TCI states, the UE 120 may determine whether to transmit a PUCCH communication in the SFN mode, the TDM mode, and/or the single TCI state using the techniques described above. Furthermore, in cases where the UE 120 transmits the PUCCH communication in the SFN mode (e.g., simultaneously in the same PUCCH resource using two or more beams), the UE 120 may generally transmit the PUCCH communication in one repetition (e.g., the UE 120 does not expect the number of repetitions for a PUCCH transmission in the SFN mode to be larger than one). Accordingly, in cases where the UE 120 does not expect the number of repetitions for a PUCCH transmission in the SFN mode to be larger than one and the number of repetitions for the PUCCH communication is larger than one, all repetitions of the PUCCH communication may be transmitted with a single beam in the single TCI state (e.g., in multiple repetitions using a single TCI state, of the multiple uplink TCI states or multiple joint downlink and uplink TCI states indicated in the beam information). Alternatively, each of the multiple repetitions of the PUCCH communication may be transmitted with a single beam in the TDM mode (e.g., in multiple repetitions, where one set of repetitions uses a first TCI state, of the multiple uplink TCI states or multiple joint downlink and uplink TCI states indicated in the beam information, and a second set of repetitions uses a second TCI state, of the multiple TCI states indicated in the beam information).

Alternatively, in cases where the number of repetitions for a PUCCH transmission in the SFN mode is permitted to be larger than one (e.g., different repetitions of the PUCCH communication are transmitted using the same PUCCH resource in different slots or sub-slots), each repetition of the PUCCH communication may be transmitted in the SFN mode, as shown by reference number 850. Alternatively, one or more repetitions of the PUCCH communication may be transmitted in the SFN mode and one or more repetitions of the PUCCH communication may be transmitted using a single TCI state (e.g., using one of the multiple TCI states indicated in the beam information in the TDM mode or the single TCI state mode). For example, reference number 860 depicts an example in which one or more repetitions of the PUCCH communication are transmitted in the SFN mode and one or more repetitions of the PUCCH communication are transmitted in the TDM mode. For example, as shown by reference number 860, multiple TCI states are used to transmit a first repetition of a PUCCH communication in the SFN mode in a first slot or sub-slot, a first TCI state (of the multiple TCI states indicated in the beam information) is used to transmit a second repetition of the PUCCH communication in the TDM mode in a second slot or sub-slot, a second TCI state (of the multiple TCI states indicated in the beam information) is used to transmit a third repetition of the PUCCH communication in the TDM mode in a third slot or sub-slot, and the pattern then repeats. Accordingly, in this example, a repetition of a PUCCH communication may be included in a first set of repetitions that are simultaneously transmitted using multiple TCI states in the SFN mode, a second set of repetitions that are transmitted using a first TCI state in the TDM or single TCI state mode, a third set of repetitions that are transmitted using a second TCI state in the TDM or single TCI state mode, or the like. In these cases, the network node 110 may indicate, to the UE 120, a mapping pattern that maps each repetition of the PUCCH communication to a particular set using semi-static (e.g., RRC) signaling.

As indicated above, FIG. 8 is provided as an example. Other examples may differ from what is described with respect to FIG. 8.

Figure 9:
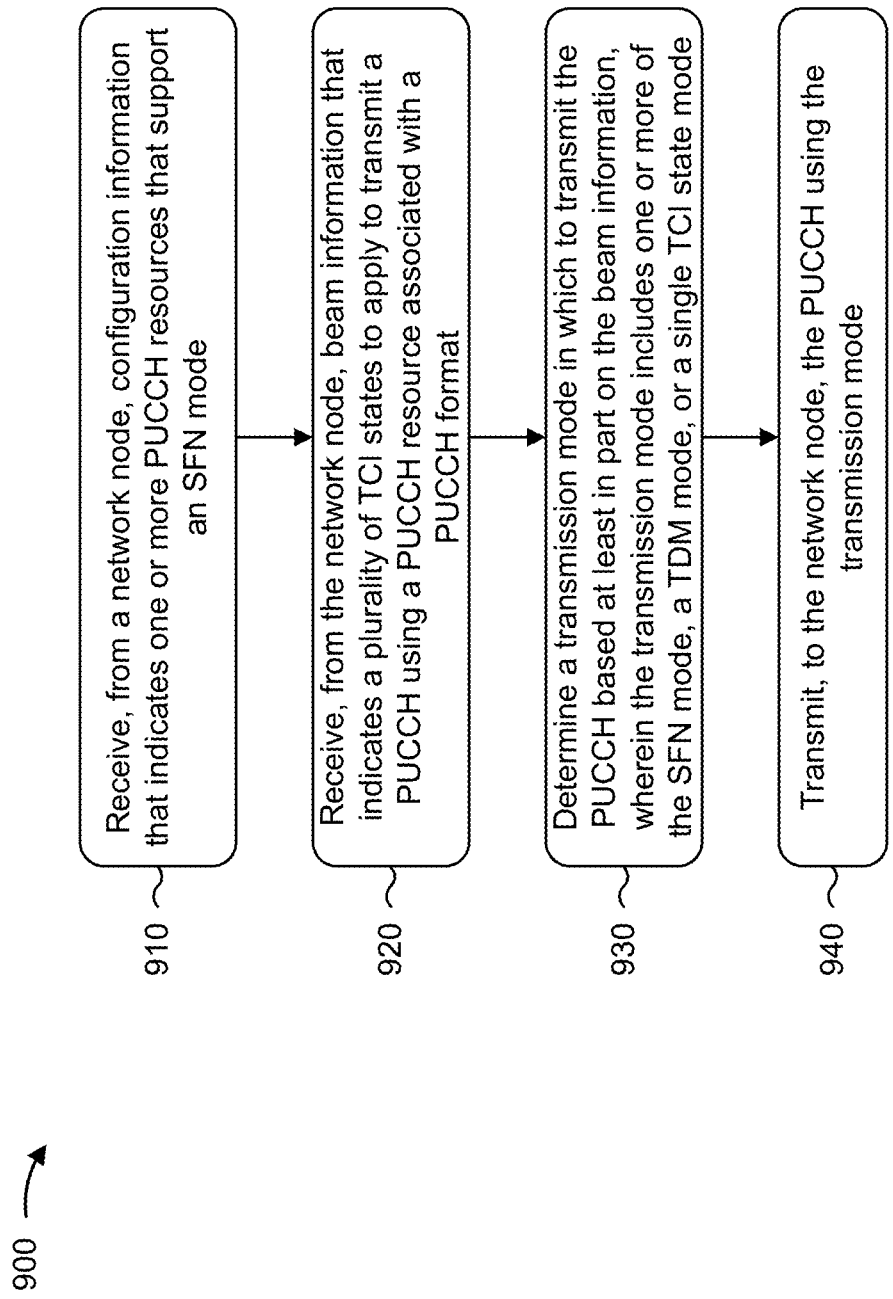
FIGS. 9-10 are diagrams illustrating example processes associated with SFN and TDM PUCCH, in accordance with the present disclosure.

FIG. 9 is a diagram illustrating an example process 900 performed, for example, by a UE, in accordance with the present disclosure. Example process 900 is an example where the UE (e.g., UE 120) performs operations associated with techniques for SFN and TDM PUCCH.

As shown in FIG. 9, in some aspects, process 900 may include receiving, from a network node, configuration information that indicates one or more PUCCH resources that support an SFN mode (block 910). For example, the UE (e.g., using communication manager 140 and/or reception component 1102, depicted in FIG. 11) may receive, from a network node, configuration information that indicates one or more PUCCH resources that support an SFN mode, as described above.

As further shown in FIG. 9, in some aspects, process 900 may include receiving, from the network node, beam information that indicates a plurality of TCI states to apply to transmit a PUCCH using a PUCCH resource associated with a PUCCH format (block 920). For example, the UE (e.g., using communication manager 140 and/or reception component 1102, depicted in FIG. 11) may receive, from the network node, beam information that indicates a plurality of TCI states to apply to transmit a PUCCH using a PUCCH resource associated with a PUCCH format, as described above.

As further shown in FIG. 9, in some aspects, process 900 may include determining a transmission mode in which to transmit the PUCCH based at least in part on the beam information, wherein the transmission mode includes one or more of the SFN mode, a TDM mode, or a single TCI state mode (block 930). For example, the UE (e.g., using communication manager 140 and/or determination component 1108, depicted in FIG. 11) may determine a transmission mode in which to transmit the PUCCH based at least in part on the beam information, wherein the transmission mode includes one or more of the SFN mode, a TDM mode, or a single TCI state mode, as described above.

As further shown in FIG. 9, in some aspects, process 900 may include transmitting, to the network node, the PUCCH using the transmission mode (block 940). For example, the UE (e.g., using communication manager 140 and/or transmission component 1104, depicted in FIG. 11) may transmit, to the network node, the PUCCH using the transmission mode, as described above.

Process 900 may include additional aspects, such as any single aspect or any combination of aspects described below and/or in connection with one or more other processes described elsewhere herein.

In a first aspect, the configuration information is included in a PUCCH configuration IE applied to all PUCCH resources and PUCCH formats associated with a physical layer priority in an uplink bandwidth part in a serving cell.

In a second aspect, alone or in combination with the first aspect, the transmission mode includes the SFN mode based at least in part on the beam information indicating the plurality of TCI states for one or more of the PUCCH resources associated with the PUCCH configuration IE.

In a third aspect, alone or in combination with one or more of the first and second aspects, the transmission mode includes the SFN mode based at least in part on the PUCCH configuration IE including a parameter that enables the SFN mode.

In a fourth aspect, alone or in combination with one or more of the first through third aspects, the transmission mode is determined based at least in part on a PUCCH mapping pattern configured by the PUCCH configuration IE.

In a fifth aspect, alone or in combination with one or more of the first through fourth aspects, the configuration information is included in a PUCCH format configuration IE applied to all PUCCH resources configured with a PUCCH format associated with the PUCCH format configuration IE.

In a sixth aspect, alone or in combination with one or more of the first through fifth aspects, the transmission mode includes the SFN mode based at least in part on the PUCCH format configuration IE including a parameter that enables the SFN mode.

In a seventh aspect, alone or in combination with one or more of the first through sixth aspects, the transmission mode includes the TDM mode or the single TCI state mode based at least in part on the beam information indicating the plurality of TCI states for a PUCCH format associated with a PUCCH format configuration IE in which support for the SFN mode is not configured.

In an eighth aspect, alone or in combination with one or more of the first through seventh aspects, the configuration information is included in a PUCCH resource configuration IE applied to all PUCCH transmissions that use a PUCCH resource associated with the PUCCH resource configuration IE.

In a ninth aspect, alone or in combination with one or more of the first through eighth aspects, the transmission mode includes the SFN mode based at least in part on the PUCCH resource configuration IE including a parameter that enables the SFN mode.

In a tenth aspect, alone or in combination with one or more of the first through ninth aspects, the transmission mode includes the TDM mode or the single TCI state mode based at least in part on the beam information indicating the plurality of TCI states for a PUCCH resource associated with a PUCCH resource configuration IE in which support for the SFN mode is not configured.

In an eleventh aspect, alone or in combination with one or more of the first through tenth aspects, determining the transmission mode includes determining a type of the PUCCH, wherein the type includes an aperiodic PUCCH, a semi-persistent PUCCH, or a periodic PUCCH, and wherein the transmission mode is determined based at least in part on the type of the PUCCH.

In a twelfth aspect, alone or in combination with one or more of the first through eleventh aspects, the PUCCH is scheduled by DCI that includes one or more bits to dynamically indicate the transmission mode for the PUCCH.

In a thirteenth aspect, alone or in combination with one or more of the first through twelfth aspects, the PUCCH is transmitted in one repetition based at least in part on a determination that the SFN mode is the transmission mode indicated in the beam information.

In a fourteenth aspect, alone or in combination with one or more of the first through thirteenth aspects, the PUCCH is transmitted in multiple repetitions that are each associated with a single beam associated with one of the plurality of TCI states indicated in the beam information based at least in part on a determination that the TDM mode is the transmission mode indicated in the beam information.

In a fifteenth aspect, alone or in combination with one or more of the first through fourteenth aspects, the PUCCH is transmitted in multiple repetitions that are all associated with a single beam associated with one of the plurality of TCI states indicated in the beam information based at least in part on a determination that the transmission mode the single TCI state mode is the transmission mode indicated in the beam information.

In a sixteenth aspect, alone or in combination with one or more of the first through fifteenth aspects, the plurality of TCI states are used to simultaneously transmit the PUCCH in different transmission time intervals based at least in part on a determination that multiple repetitions of the PUCCH are configured in the SFN mode.

In a seventeenth aspect, alone or in combination with one or more of the first through sixteenth aspects, the plurality of TCI states are used to simultaneously transmit a first repetition of the PUCCH in a first transmission time interval and one TCI state, of the plurality of TCI states, is used to transmit a second repetition of the PUCCH in a second transmission time interval based at least in part on a determination that the first repetition of the PUCCH is configured in the SFN mode and the second repetition of the PUCCH is configured in the TDM mode or the single TCI state mode.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
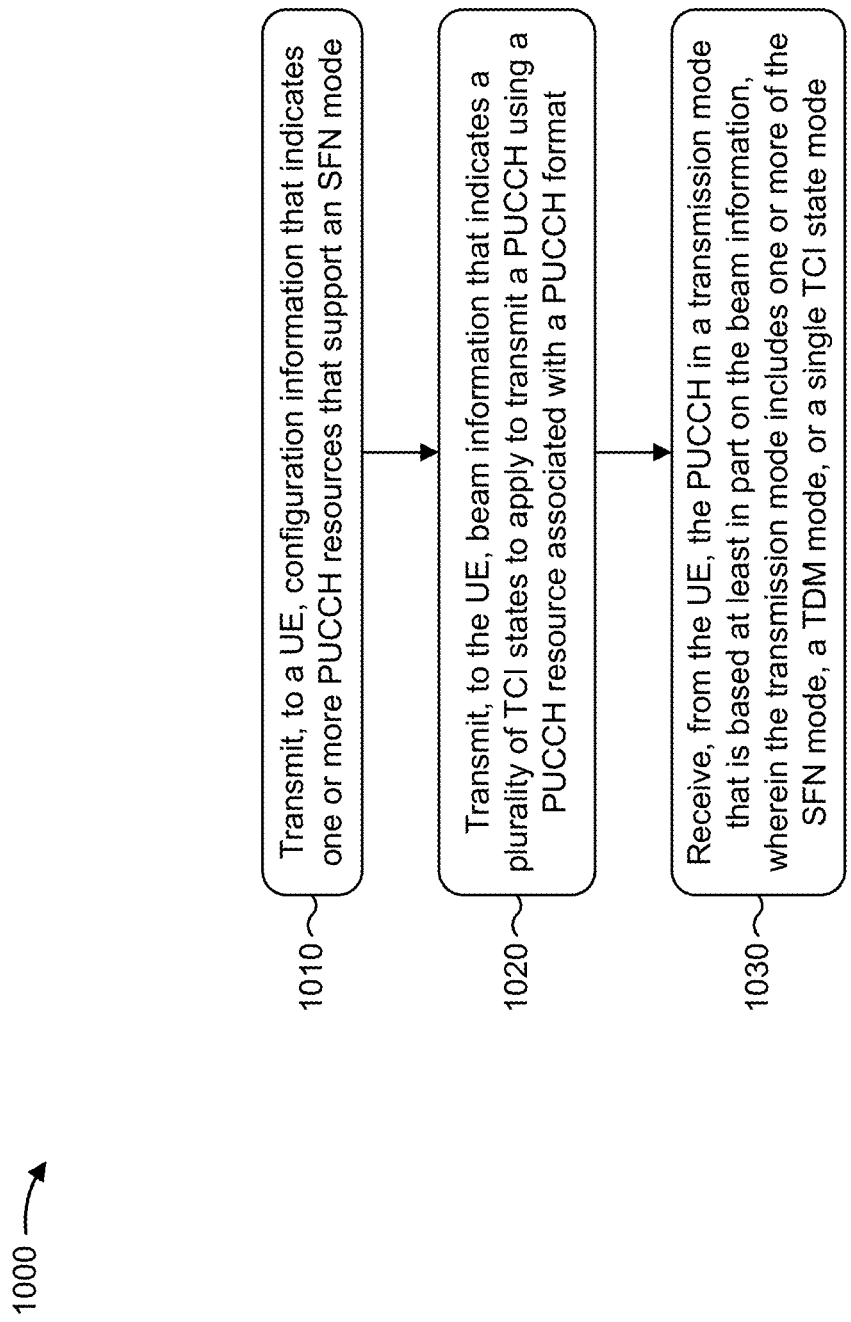

FIG. 10 is a diagram illustrating an example process 1000 performed, for example, by a network node, in accordance with the present disclosure. Example process 1000 is an example where the network node (e.g., network node 110) performs operations associated with techniques for SFN and TDM PUCCH.

As shown in FIG. 10, in some aspects, process 1000 may include transmitting, to a UE, configuration information that indicates one or more PUCCH resources that support an SFN mode (block 1010). For example, the network node (e.g., using communication manager 150 and/or transmission component 1204, depicted in FIG. 12) may transmit, to a UE, configuration information that indicates one or more PUCCH resources that support an SFN mode, as described above.

As further shown in FIG. 10, in some aspects, process 1000 may include transmitting, to the UE, beam information that indicates a plurality of TCI states to apply to transmit a PUCCH using a PUCCH resource associated with a PUCCH format (block 1020). For example, the network node (e.g., using communication manager 150 and/or transmission component 1204, depicted in FIG. 12) may transmit, to the UE, beam information that indicates a plurality of TCI states to apply to transmit a PUCCH using a PUCCH resource associated with a PUCCH format, as described above.

As further shown in FIG. 10, in some aspects, process 1000 may include receiving, from the UE, the PUCCH in a transmission mode that is based at least in part on the beam information, wherein the transmission mode includes one or more of the SFN mode, a TDM mode, or a single TCI state mode (block 1030). For example, the network node (e.g., using communication manager 150 and/or reception component 1202, depicted in FIG. 12) may receive, from the UE, the PUCCH in a transmission mode that is based at least in part on the beam information, wherein the transmission mode includes one or more of the SFN mode, a TDM mode, or a single TCI state mode, as described above.

Process 1000 may include additional aspects, such as any single aspect or any combination of aspects described below and/or in connection with one or more other processes described elsewhere herein.

In a first aspect, the configuration information is included in a PUCCH configuration IE applied to all PUCCH resources and PUCCH formats associated with a physical layer priority in an uplink bandwidth part in a serving cell.

In a second aspect, alone or in combination with the first aspect, the transmission mode includes the SFN mode based at least in part on the beam information indicating the plurality of TCI states for one or more of the PUCCH resources associated with the PUCCH configuration IE.

In a third aspect, alone or in combination with one or more of the first and second aspects, the transmission mode includes the SFN mode based at least in part on the PUCCH configuration IE including a parameter that enables the SFN mode.

In a fourth aspect, alone or in combination with one or more of the first through third aspects, the transmission mode is based at least in part on a PUCCH mapping pattern configured by the PUCCH configuration IE.

In a fifth aspect, alone or in combination with one or more of the first through fourth aspects, the configuration information is included in a PUCCH format configuration IE applied to all PUCCH resources configured with a PUCCH format associated with the PUCCH format configuration IE.

In a sixth aspect, alone or in combination with one or more of the first through fifth aspects, the transmission mode includes the SFN mode based at least in part on the PUCCH format configuration IE including a parameter that enables the SFN mode.

In a seventh aspect, alone or in combination with one or more of the first through sixth aspects, the transmission mode includes the TDM mode or the single TCI state mode based at least in part on the beam information indicating the plurality of TCI states for a PUCCH format associated with a PUCCH format configuration IE in which support for the SFN mode is not configured.

In an eighth aspect, alone or in combination with one or more of the first through seventh aspects, the configuration information is included in a PUCCH resource configuration IE applied to all PUCCH transmissions that use a PUCCH resource associated with the PUCCH resource configuration IE.

In a ninth aspect, alone or in combination with one or more of the first through eighth aspects, the transmission mode includes the SFN mode based at least in part on the PUCCH resource configuration IE including a parameter that enables the SFN mode.

In a tenth aspect, alone or in combination with one or more of the first through ninth aspects, the transmission mode includes the TDM mode or the single TCI state mode based at least in part on the beam information indicating the plurality of TCI states for a PUCCH resource associated with a PUCCH resource configuration IE in which support for the SFN mode is not configured.

In an eleventh aspect, alone or in combination with one or more of the first through tenth aspects, the transmission mode is based at least in part on whether the PUCCH is aperiodic, semi-persistent, or periodic.

In a twelfth aspect, alone or in combination with one or more of the first through eleventh aspects, the PUCCH is scheduled by DCI that includes one or more bits to dynamically indicate the transmission mode for the PUCCH.

In a thirteenth aspect, alone or in combination with one or more of the first through twelfth aspects, the PUCCH is received in one repetition based at least in part on the SFN mode being the transmission mode indicated in the beam information.

In a fourteenth aspect, alone or in combination with one or more of the first through thirteenth aspects, the PUCCH is received in multiple repetitions that are each associated with a single beam associated with one of the plurality of TCI states indicated in the beam information based at least in part on the TDM mode being the transmission mode indicated in the beam information.

In a fifteenth aspect, alone or in combination with one or more of the first through fourteenth aspects, the PUCCH is received in multiple repetitions that are all associated with a single beam associated with one of the plurality of TCI states indicated in the beam information based at least in part on the single TCI state mode being the transmission mode indicated in the beam information.

In a sixteenth aspect, alone or in combination with one or more of the first through fifteenth aspects, the plurality of TCI states are used to simultaneously receive the PUCCH in different transmission time intervals based at least in part on multiple repetitions of the PUCCH being configured in the SFN mode.

In a seventeenth aspect, alone or in combination with one or more of the first through sixteenth aspects, the plurality of TCI states are used to simultaneously receive a first repetition of the PUCCH in a first transmission time interval and one TCI state, of the plurality of TCI states, is used to receive a second repetition of the PUCCH in a second transmission time interval based at least in part on the first repetition of the PUCCH being configured in the SFN mode and the second repetition of the PUCCH being configured in the TDM mode or the single TCI state mode.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
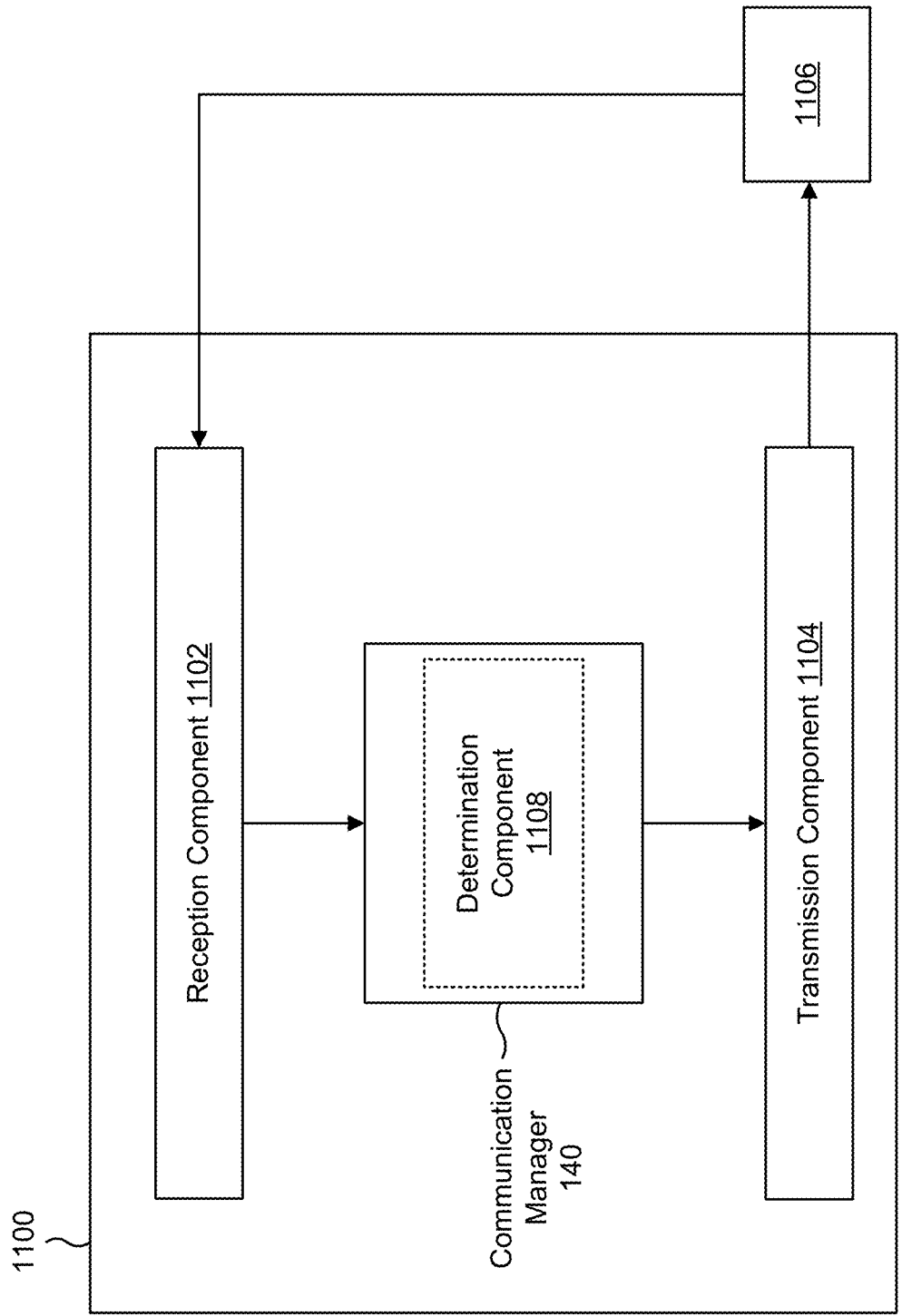
FIGS. 11-12 are diagrams of example apparatuses for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a determination component 1108, among other examples.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a network node, configuration information that indicates one or more PUCCH resources that support an SFN mode. The reception component 1102 may receive, from the network node, beam information that indicates a plurality of TCI states to apply to transmit a PUCCH using a PUCCH resource associated with a PUCCH format. The determination component 1108 may determine a transmission mode in which to transmit the PUCCH based at least in part on the beam information, wherein the transmission mode includes one or more of the SFN mode, a TDM mode, or a single TCI state mode. The transmission component 1104 may transmit, to the network node, the PUCCH using the transmission mode.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
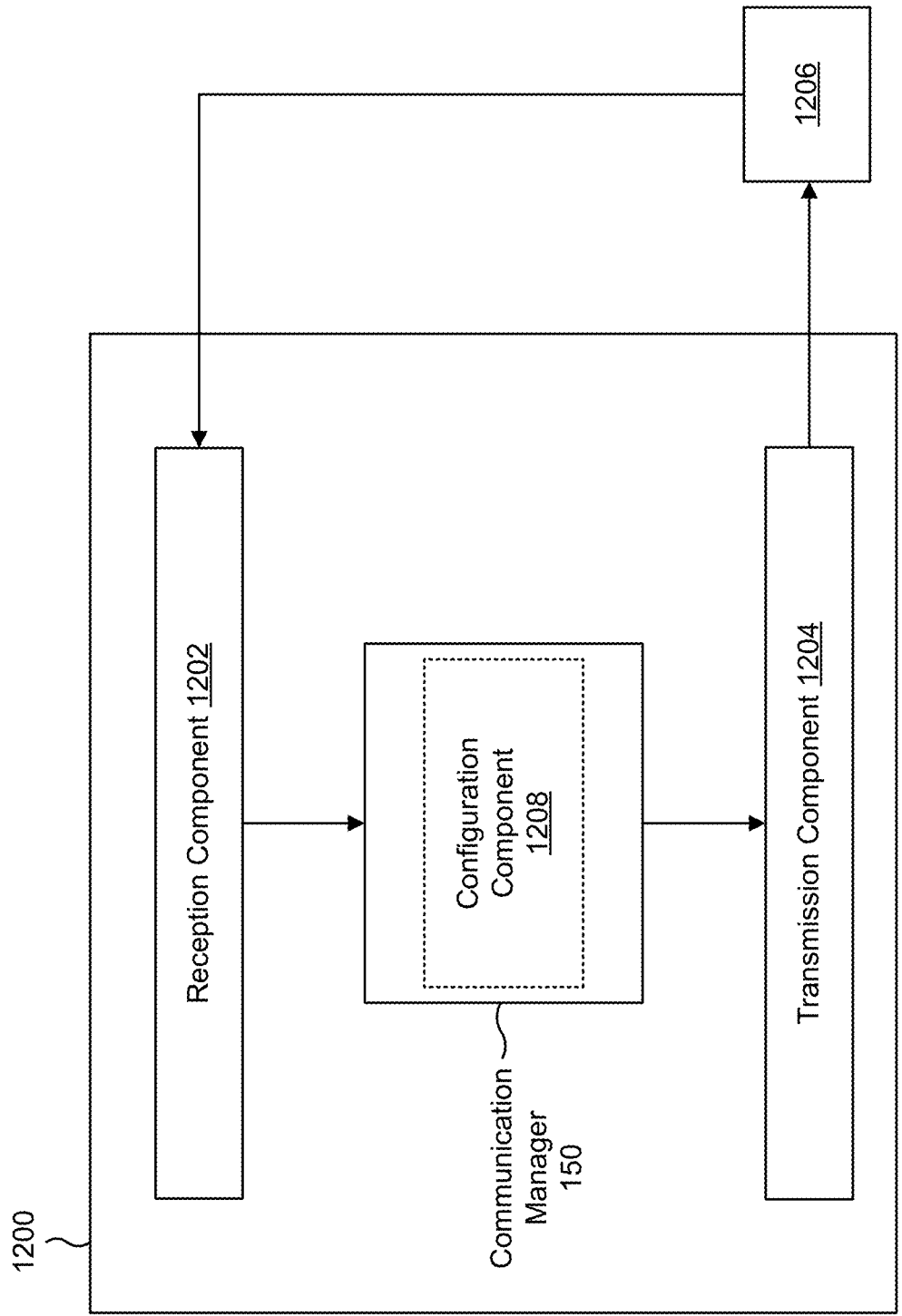

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a configuration component 1208, among other examples.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The configuration component 1208 may generate configuration information related to one or more PUCCH resources that support an SFN mode transmission component. The transmission component 1204 may transmit, to a UE, the configuration information that indicates the one or more PUCCH resources that support the SFN mode. The transmission component 1204 may transmit, to the UE, beam information that indicates a plurality of TCI states to apply to transmit a PUCCH using a PUCCH resource associated with a PUCCH format. The reception component 1202 may receive, from the UE, the PUCCH in a transmission mode that is based at least in part on the beam information, wherein the transmission mode includes one or more of the SFN mode, a TDM mode, or a single TCI state mode.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving, from a network node, configuration information that indicates one or more PUCCH resources that support an SFN mode; receiving, from the network node, beam information that indicates a plurality of TCI states to apply to transmit a PUCCH using a PUCCH resource associated with a PUCCH format; determining a transmission mode in which to transmit the PUCCH based at least in part on the beam information, wherein the transmission mode includes one or more of the SFN mode, a TDM mode, or a single TCI state mode; and transmitting, to the network node, the PUCCH using the transmission mode.

Aspect 2: The method of Aspect 1, wherein the configuration information is included in a PUCCH configuration IE applied to all PUCCH resources and PUCCH formats associated with a physical layer priority in an uplink bandwidth part in a serving cell.

Aspect 3: The method of Aspect 2, wherein the transmission mode includes the SFN mode based at least in part on the beam information indicating the plurality of TCI states for one or more of the PUCCH resources associated with the PUCCH configuration IE.

Aspect 4: The method of any of Aspects 2-3, wherein the transmission mode includes the SFN mode based at least in part on the PUCCH configuration IE including a parameter that enables the SFN mode.

Aspect 5: The method of any of Aspects 2-3, wherein the transmission mode is determined based at least in part on a PUCCH mapping pattern configured by the PUCCH configuration IE.

Aspect 6: The method of any of Aspects 1-5, wherein the configuration information is included in a PUCCH format configuration IE applied to all PUCCH resources configured with a PUCCH format associated with the PUCCH format configuration IE.

Aspect 7: The method of Aspect 6, wherein the transmission mode includes the SFN mode based at least in part on the PUCCH format configuration IE including a parameter that enables the SFN mode.

Aspect 8: The method of any of Aspects 6-7, wherein the transmission mode includes the TDM mode or the single TCI state mode based at least in part on the beam information indicating the plurality of TC states for a PUCCH format associated with a PUCCH format configuration IE in which support for the SFN mode is not configured.

Aspect 9: The method of any of Aspects 1-8, wherein the configuration information is included in a PUCCH resource configuration IE applied to all PUCCH transmissions that use a PUCCH resource associated with the PUCCH resource configuration IE.

Aspect 10: The method of Aspect 9, wherein the transmission mode includes the SFN mode based at least in part on the PUCCH resource configuration IE including a parameter that enables the SFN mode.

Aspect 11: The method of any of Aspects 9-10, wherein the transmission mode includes the TDM mode or the single TCI state mode based at least in part on the beam information indicating the plurality of TC states for a PUCCH resource associated with a PUCCH resource configuration IE in which support for the SFN mode is not configured.

Aspect 12: The method of any of Aspects 1-11, wherein determining the transmission mode includes: determining a type of the PUCCH, wherein the type includes an aperiodic PUCCH, a semi-persistent PUCCH, or a periodic PUCCH, and wherein the transmission mode is determined based at least in part on the type of the PUCCH.

Aspect 13: The method of any of Aspects 1-12, wherein the PUCCH is scheduled by DCI that includes one or more bits to dynamically indicate the transmission mode for the PUCCH.

Aspect 14: The method of any of Aspects 1-13, wherein the PUCCH is transmitted in one repetition based at least in part on a determination that the SFN mode is the transmission mode indicated in the beam information.

Aspect 15: The method of any of Aspects 1-14, wherein the PUCCH is transmitted in multiple repetitions that are each associated with a single beam associated with one of the plurality of TCI states indicated in the beam information based at least in part on a determination that the TDM mode is the transmission mode indicated in the beam information.

Aspect 16: The method of any of Aspects 1-15, wherein the PUCCH is transmitted in multiple repetitions that are all associated with a single beam associated with one of the plurality of TCI states indicated in the beam information based at least in part on a determination that the transmission mode the single TCI state mode is the transmission mode indicated in the beam information.

Aspect 17: The method of any of Aspects 1-16, wherein the plurality of TCI states are used to simultaneously transmit the PUCCH in different transmission time intervals based at least in part on a determination that multiple repetitions of the PUCCH are configured in the SFN mode.

Aspect 18: The method of any of Aspects 1-17, wherein the plurality of TCI states are used to simultaneously transmit a first repetition of the PUCCH in a first transmission time interval and one TCI state, of the plurality of TCI states, is used to transmit a second repetition of the PUCCH in a second transmission time interval based at least in part on a determination that the first repetition of the PUCCH is configured in the SFN mode and the second repetition of the PUCCH is configured in the TDM mode or the single TCI state mode.

Aspect 19: A method of wireless communication performed by a network node, comprising: transmitting, to a UE, configuration information that indicates one or more PUCCH resources that support an SFN mode; transmitting, to the UE, beam information that indicates a plurality of TCI states to apply to transmit a PUCCH using a PUCCH resource associated with a PUCCH format; and receiving, from the UE, the PUCCH in a transmission mode that is based at least in part on the beam information, wherein the transmission mode includes one or more of the SFN mode, a TDM mode, or a single TCI state mode.

Aspect 20: The method of Aspect 19, wherein the configuration information is included in a PUCCH configuration IE applied to all PUCCH resources and PUCCH formats associated with a physical layer priority in an uplink bandwidth part in a serving cell.

Aspect 21: The method of Aspect 20, wherein the transmission mode includes the SFN mode based at least in part on the beam information indicating the plurality of TCI states for one or more of the PUCCH resources associated with the PUCCH configuration IE.

Aspect 22: The method of any of Aspects 20-21, wherein the transmission mode includes the SFN mode based at least in part on the PUCCH configuration IE including a parameter that enables the SFN mode.

Aspect 23: The method of any of Aspects 20-22, wherein the transmission mode is based at least in part on a PUCCH mapping pattern configured by the PUCCH configuration IE.

Aspect 24: The method of any of Aspects 19-23, wherein the configuration information is included in a PUCCH format configuration IE applied to all PUCCH resources configured with a PUCCH format associated with the PUCCH format configuration IE.

Aspect 25: The method of Aspect 24, wherein the transmission mode includes the SFN mode based at least in part on the PUCCH format configuration IE including a parameter that enables the SFN mode.

Aspect 26: The method of any of Aspects 24-25, wherein the transmission mode includes the TDM mode or the single TCI state mode based at least in part on the beam information indicating the plurality of TC states for a PUCCH format associated with a PUCCH format configuration IE in which support for the SFN mode is not configured.

Aspect 27: The method of any of Aspects 19-26, wherein the configuration information is included in a PUCCH resource configuration IE applied to all PUCCH transmissions that use a PUCCH resource associated with the PUCCH resource configuration IE.

Aspect 28: The method of Aspect 27, wherein the transmission mode includes the SFN mode based at least in part on the PUCCH resource configuration IE including a parameter that enables the SFN mode.

Aspect 29: The method of any of Aspects 27-28, wherein the transmission mode includes the TDM mode or the single TCI state mode based at least in part on the beam information indicating the plurality of TC states for a PUCCH resource associated with a PUCCH resource configuration IE in which support for the SFN mode is not configured.

Aspect 30: The method of any of Aspects 19-29, wherein the transmission mode is based at least in part on whether the PUCCH is aperiodic, semi-persistent, or periodic.

Aspect 31: The method of any of Aspects 19-30, wherein the PUCCH is scheduled by DCI that includes one or more bits to dynamically indicate the transmission mode for the PUCCH.

Aspect 32: The method of any of Aspects 19-31, wherein the PUCCH is received in one repetition based at least in part on the SFN mode being the transmission mode indicated in the beam information.

Aspect 33: The method of any of Aspects 19-32, wherein the PUCCH is received in multiple repetitions that are each associated with a single beam associated with one of the plurality of TCI states indicated in the beam information based at least in part on the TDM mode being the transmission mode indicated in the beam information.

Aspect 34: The method of any of Aspects 19-34, wherein the PUCCH is received in multiple repetitions that are all associated with a single beam associated with one of the plurality of TCI states indicated in the beam information based at least in part on the single TCI state mode being the transmission mode indicated in the beam information.

Aspect 35: The method of any of Aspects 19-34, wherein the plurality of TCI states are used to simultaneously receive the PUCCH in different transmission time intervals based at least in part on multiple repetitions of the PUCCH being configured in the SFN mode.

Aspect 36: The method of any of Aspects 19-35, wherein the plurality of TCI states are used to simultaneously receive a first repetition of the PUCCH in a first transmission time interval and one TCI state, of the plurality of TCI states, is used to receive a second repetition of the PUCCH in a second transmission time interval based at least in part on the first repetition of the PUCCH being configured in the SFN mode and the second repetition of the PUCCH being configured in the TDM mode or the single TCI state mode.

Aspect 37: An apparatus for wireless communication at a device, comprising a processor; memory coupled with the processor; and instructions stored in the memory and executable by the processor to cause the apparatus to perform the method of one or more of Aspects 1-18.

Aspect 38: A device for wireless communication, comprising a memory and one or more processors coupled to the memory, the one or more processors configured to perform the method of one or more of Aspects 1-18.

Aspect 39: An apparatus for wireless communication, comprising at least one means for performing the method of one or more of Aspects 1-18.

Aspect 40: A non-transitory computer-readable medium storing code for wireless communication, the code comprising instructions executable by a processor to perform the method of one or more of Aspects 1-18.

Aspect 41: A non-transitory computer-readable medium storing a set of instructions for wireless communication, the set of instructions comprising one or more instructions that, when executed by one or more processors of a device, cause the device to perform the method of one or more of Aspects 1-18.

Aspect 42: An apparatus for wireless communication at a device, comprising a processor; memory coupled with the processor; and instructions stored in the memory and executable by the processor to cause the apparatus to perform the method of one or more of Aspects 19-36.

Aspect 43: A device for wireless communication, comprising a memory and one or more processors coupled to the memory, the one or more processors configured to perform the method of one or more of Aspects 19-36.

Aspect 44: An apparatus for wireless communication, comprising at least one means for performing the method of one or more of Aspects 19-36.

Aspect 45: A non-transitory computer-readable medium storing code for wireless communication, the code comprising instructions executable by a processor to perform the method of one or more of Aspects 19-36.

Aspect 46: A non-transitory computer-readable medium storing a set of instructions for wireless communication, the set of instructions comprising one or more instructions that, when executed by one or more processors of a device, cause the device to perform the method of one or more of Aspects 19-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may, depending on the context, refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of": a, b, or c is intended to cover: a, b, c, a+b, a+c, b+c, and a+b+c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A also may have B). Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the media described herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by a user equipment (UE), comprising:
   receiving, from a network node, configuration information that indicates one or more physical uplink control channel (PUCCH) resources, of a set of PUCCH resources, that support a single frequency network (SFN) mode;
   receiving, from the network node, beam information that indicates a plurality of transmission configuration indication (TCI) states to apply to transmit a PUCCH using the set of PUCCH resources associated with a PUCCH format, wherein the PUCCH comprises a set of PUCCH repetitions, wherein the set of PUCCH repetitions are associated with the plurality of TCI states;
   determining a transmission mode in which to transmit the PUCCH, in a PUCCH resource of the set of PUCCH resources, based at least in part on the beam information and whether the PUCCH resource supports the SFN mode, wherein the transmission mode includes one or more of the SFN mode, a time division multiplexing (TDM) mode, or a single TCI state mode; and
   transmitting, to the network node, the PUCCH using the transmission mode.

2. The method of claim 1,
   wherein the configuration information is included in a PUCCH configuration information element (IE) applied to all PUCCH resources and PUCCH formats associated with a physical layer priority in an uplink bandwidth part in a serving cell.

3. The method of claim 2,
   wherein the transmission mode includes the SFN mode based at least in part on the beam information indicating the plurality of TCI states for one or more of the PUCCH resources associated with the PUCCH configuration IE.

4. The method of claim 2,
   wherein the transmission mode includes the SFN mode based at least in part on the PUCCH configuration IE including a parameter that enables the SFN mode.

5. The method of claim 2,
   wherein the transmission mode is determined based at least in part on a PUCCH mapping pattern configured by the PUCCH configuration IE.

6. The method of claim 1,
   wherein the configuration information is included in a PUCCH format configuration information element (IE) applied to all PUCCH resources configured with a PUCCH format associated with the PUCCH format configuration IE.

7. The method of claim 6,
   wherein the transmission mode includes the SFN mode based at least in part on the PUCCH format configuration IE including a parameter that enables the SFN mode.

8. The method of claim 6,
   wherein the transmission mode includes the TDM mode or the single TCI state mode based at least in part on the beam information indicating the plurality of TCI states for a PUCCH format associated with a PUCCH format configuration IE in which support for the SFN mode is not configured.

9. The method of claim 1,
wherein the configuration information is included in a PUCCH resource configuration information element (IE) applied to all PUCCH transmissions that use a PUCCH resource associated with the PUCCH resource configuration IE.

10. The method of claim 9,
wherein the transmission mode includes the SFN mode based at least in part on the PUCCH resource configuration IE including a parameter that enables the SFN mode.

11. The method of claim 9,
wherein the transmission mode includes the TDM mode or the single TCI state mode based at least in part on the beam information indicating the plurality of TCI states for a PUCCH resource associated with a PUCCH resource configuration IE in which support for the SFN mode is not configured.

12. The method of claim 1,
wherein determining the transmission mode includes:
determining a type of the PUCCH, wherein the type includes an aperiodic PUCCH, a semi-persistent PUCCH, or a periodic PUCCH, and wherein the transmission mode is determined based at least in part on the type of the PUCCH.

13. The method of claim 1,
wherein the PUCCH is scheduled by downlink control information that includes one or more bits to dynamically indicate the transmission mode for the PUCCH.

14. The method of claim 1,
wherein the PUCCH is transmitted in one repetition, of the set of PUCCH repetitions, based at least in part on a determination that the SFN mode is the transmission mode indicated in the beam information.

15. The method of claim 1,
wherein the PUCCH is transmitted in multiple repetitions, of the set of PUCCH repetitions, that are each associated with a single beam associated with one of the plurality of TCI states indicated in the beam information based at least in part on a determination that the TDM mode is the transmission mode indicated in the beam information.

16. The method of claim 1,
wherein the PUCCH is transmitted in multiple repetitions, of the set of PUCCH repetitions, that are all associated with a single beam associated with one of the plurality of TCI states indicated in the beam information based at least in part on a determination that the transmission mode the single TCI state mode is the transmission mode indicated in the beam information.

17. The method of claim 1,
wherein the plurality of TCI states are used to simultaneously transmit the PUCCH in different transmission time intervals based at least in part on a determination that multiple repetitions, of the set of PUCCH repetitions, of the PUCCH are configured in the SFN mode.

18. The method of claim 1,
wherein the plurality of TCI states are used to simultaneously transmit a first repetition, of the set of PUCCH repetitions, of the PUCCH in a first transmission time interval and one TCI state, of the plurality of TCI states, is used to transmit a second repetition of the PUCCH, of the set of PUCCH repetitions, in a second transmission time interval based at least in part on a determination that the first repetition of the PUCCH is configured in the SFN mode and the second repetition of the PUCCH is configured in the TDM mode or the single TCI state mode.

19. A method of wireless communication performed by a network node, comprising:
transmitting, to a user equipment (UE), configuration information that indicates one or more physical uplink control channel (PUCCH) resources, of a set of PUCCH resources, that support a single frequency network (SFN) mode;
transmitting, to the UE, beam information that indicates a plurality of transmission configuration indication (TCI) states to apply to transmit a PUCCH using the set of PUCCH resources associated with a PUCCH format, wherein the PUCCH comprises a set of PUCCH repetitions, wherein the set of PUCCH repetitions are associated with the plurality of TCI states; and
receiving, from the UE, the PUCCH, in a PUCCH resource of the set of PUCCH resources, in a transmission mode is based at least in part on the beam information and whether the PUCCH resource supports the SFN mode, wherein the transmission mode includes one or more of the SFN mode, a time division multiplexing (TDM) mode, or a single TCI state mode.

20. The method of claim 19,
wherein the configuration information is included in a PUCCH configuration information element (IE) applied to all PUCCH resources and PUCCH formats associated with a physical layer priority in an uplink bandwidth part in a serving cell.

21. The method of claim 19,
wherein the configuration information is included in a PUCCH format configuration information element (IE) applied to all PUCCH resources configured with a PUCCH format associated with the PUCCH format configuration IE.

22. The method of claim 19,
wherein the configuration information is included in a PUCCH resource configuration information element (IE) applied to all PUCCH transmissions that use a PUCCH resource associated with the PUCCH resource configuration IE.

23. The method of claim 19,
wherein the transmission mode is based at least in part on whether the PUCCH is aperiodic, semi-persistent, or periodic.

24. The method of claim 19,
wherein the PUCCH is scheduled by downlink control information that includes one or more bits to dynamically indicate the transmission mode for the PUCCH.

25. The method of claim 19,
wherein the PUCCH is received in one repetition, of the set of PUCCH repetitions, based at least in part on the SFN mode being the transmission mode indicated in the beam information.

26. The method of claim 19,
wherein the PUCCH is received in multiple repetitions, of the set of PUCCH repetitions, that are each associated with a single beam associated with one of the plurality of TCI states indicated in the beam information based at least in part on the TDM mode being the transmission mode indicated in the beam information or in multiple repetitions, of the set of PUCCH repetitions, that are all associated with a single beam associated with one of the plurality of TCI states indicated in the beam information based at least in part on the single TCI state mode being the transmission mode indicated in the beam information.

27. The method of claim 19, wherein the plurality of TCI states are used to simultaneously receive the PUCCH in different transmission time intervals based at least in part on multiple repetitions, of the set of PUCCH repetitions, of the PUCCH being configured in the SFN mode.

28. The method of claim 19, wherein the plurality of TCI states are used to simultaneously receive a first repetition of the PUCCH, of the set of PUCCH repetitions, in a first transmission time interval and one TCI state, of the plurality of TCI states, is used to receive a second repetition of the PUCCH, of the set of PUCCH repetitions, in a second transmission time interval based at least in part on the first repetition of the PUCCH being configured in the SFN mode and the second repetition of the PUCCH being configured in the TDM mode or the single TCI state mode.

29. A user equipment (UE) for wireless communication, comprising:
one or more memories; and
one or more processors, coupled to the one or more memories, configured to:
receive, from a network node, configuration information that indicates one or more physical uplink control channel (PUCCH) resources, of a set of PUCCH resources, that support a single frequency network (SFN) mode;
receive, from the network node, beam information that indicates a plurality of transmission configuration indication (TCI) states to apply to transmit the set of PUCCH resources associated with a PUCCH format, wherein the PUCCH comprises a set of PUCCH repetitions, wherein the set of PUCCH repetitions are associated with the plurality of TCI states;
determine a transmission mode in which to transmit the PUCCH, in a PUCCH resource of the set of PUCCH resources, based at least in part on the beam information and whether the PUCCH resource supports the SFN mode, wherein the transmission mode includes one or more of the SFN mode, a time division multiplexing (TDM) mode, or a single TCI state mode; and
transmit, to the network node, the PUCCH using the transmission mode.

30. A network node for wireless communication, comprising:
one or more memories; and
one or more processors, coupled to the one or more memories, configured to:
transmit, to a user equipment (UE), configuration information that indicates one or more physical uplink control channel (PUCCH) resources, of a set of PUCCH resources, that support a single frequency network (SFN) mode;
transmit, to the UE, beam information that indicates a plurality of transmission configuration indication (TCI) states to apply to transmit the set of PUCCH resources associated with a PUCCH format, wherein the PUCCH comprises a set of PUCCH repetitions, wherein the set of PUCCH repetitions are associated with the plurality of TCI states; and
receive, from the UE, the PUCCH, in a PUCCH resource of the set of PUCCH resources, in a transmission mode is based at least in part on the beam information and whether the PUCCH resource supports the SFN mode, wherein the transmission mode includes one or more of the SFN mode, a time division multiplexing (TDM) mode, or a single TCI state mode.

* * * * *